US012740912B2

(12) United States Patent
Maaskant et al.

(10) Patent No.: US 12,740,912 B2
(45) Date of Patent: Sep. 22, 2026

(54) WALKER APPARATUS WITH LIFTING PLATFORM

(71) Applicant: AXTION INDEPENDENCE MOBILITY INC., Greely (CA)

(72) Inventors: Liam Gillies Maaskant, Clinton (CA); Tracey Michele McGillivray (Laurence), Greely (CA); Suling Duong, Waterloo (CA); John Anthony Jr. Glowacki, Greely (CA)

(73) Assignee: AXTION INDEPENDENCE MOBILITY INC., Greely (CA)

( * ) Notice: Subject to any disclaimer, the term of this patent is extended or adjusted under 35 U.S.C. 154(b) by 268 days.

(21) Appl. No.: 18/255,634

(22) PCT Filed: Dec. 3, 2021

(86) PCT No.: PCT/CA2021/051726

§ 371 (c)(1),
(2) Date: Jun. 2, 2023

(87) PCT Pub. No.: WO2022/115957

PCT Pub. Date: Jun. 9, 2022

(65) Prior Publication Data

US 2024/0000651 A1 Jan. 4, 2024

Related U.S. Application Data

(60) Provisional application No. 63/121,009, filed on Dec. 3, 2020.

(51) Int. Cl.

| | |
|---|---|
| ***A61H 3/04*** | (2006.01) |
| ***A61G 7/10*** | (2006.01) |

(52) U.S. Cl.
CPC ............ *A61H 3/04* (2013.01); *A61G 7/1011* (2013.01); *A61G 7/1019* (2013.01);
(Continued)

(58) Field of Classification Search
CPC ................ A61H 3/04; A61H 2003/043; A61H 2201/0192; A61H 2201/1215;
(Continued)

(56) References Cited

U.S. PATENT DOCUMENTS

| | | | | |
|---|---|---|---|---|
| 6,371,142 B1 * | 4/2002 | Battiston | A61H 3/04 135/66 |
| 9,480,341 B2 * | 11/2016 | DiPaolo | A47C 7/546 |

(Continued)

FOREIGN PATENT DOCUMENTS

| | | | | |
|---|---|---|---|---|
| CN | 106821691 A | 6/2017 | |
| CN | 206949710 U * | 2/2018 | A45B 5/00 |

(Continued)

OTHER PUBLICATIONS

International Search Report and Written Opinion of the Office of Earlier Examination (Canadian Intellectual Property Office) dated Feb. 23, 2022 for PCT/CA2021/051726.

*Primary Examiner* — Erez Gurari
(74) *Attorney, Agent, or Firm* — NORTON ROSE FULBRIGHT CANADA LLP

(57) ABSTRACT

A support device may include a frame, a seat assembly and a lifting mechanism. The frame includes a base and an upright support. The seat assembly includes a seating surface and connecting means for operatively connecting the seating surface to the frame. The lifting mechanism is configured for vertically displacing the seat assembly between a lowered position and a seating position.

15 Claims, 25 Drawing Sheets

(52) U.S. Cl.
CPC ...... *A61G 7/1048* (2013.01); *A61H 2003/043* (2013.01); *A61H 2201/0107* (2013.01); *A61H 2201/0161* (2013.01); *A61H 2201/0192* (2013.01); *A61H 2201/1215* (2013.01); *A61H 2201/1633* (2013.01)

(58) Field of Classification Search
CPC .... A61H 2201/1633; A61H 2201/0149; A61G 7/1011; A61G 7/1019; A61G 7/1048
See application file for complete search history.

(56) References Cited

U.S. PATENT DOCUMENTS

| | | | | |
|---|---|---|---|---|
| 9,480,619 | B2 | 11/2016 | Frankian | |
| 9,610,212 | B2 | 4/2017 | Frankian | |
| 9,808,394 | B1 * | 11/2017 | Jiang | A61H 3/04 |
| 10,639,226 | B1 * | 5/2020 | Keyes | A61H 3/04 |
| 11,197,792 | B1 * | 12/2021 | Inkmann | A61G 5/14 |
| 11,432,978 | B1 * | 9/2022 | Inkmann | A61H 3/04 |
| 12,011,401 | B1 * | 6/2024 | Gold | A61G 5/10 |
| 2003/0070702 | A1 * | 4/2003 | Ownes | A61H 3/00 135/74 |
| 2007/0194547 | A1 * | 8/2007 | Steiner | A61H 3/04 280/87.021 |
| 2008/0133089 | A1 * | 6/2008 | Bayomy | A61G 5/1054 297/217.3 |
| 2010/0163087 | A1 * | 7/2010 | Catton | A61H 3/04 135/67 |
| 2012/0000496 | A1 | 1/2012 | Razon | |
| 2014/0203536 | A1 * | 7/2014 | Whitener | A61G 5/125 280/210 |
| 2017/0354564 | A1 | 12/2017 | Dirauf et al. | |
| 2019/0053970 | A1 * | 2/2019 | Vatti | A61G 7/1076 |
| 2020/0155408 | A1 * | 5/2020 | Fathi | A61H 1/00 |
| 2020/0197246 | A1 * | 6/2020 | Kim | A61G 5/14 |
| 2021/0361517 | A1 * | 11/2021 | Reuveni | A61G 5/0833 |
| 2022/0257450 | A1 * | 8/2022 | Whitmore | A61H 3/04 |
| 2022/0395413 | A1 * | 12/2022 | Powell | A61G 7/1059 |
| 2024/0000651 | A1 * | 1/2024 | Maaskant | A61H 3/04 |
| 2024/0398654 | A1 * | 12/2024 | Younger | A61H 3/04 |
| 2025/0009576 | A1 * | 1/2025 | Cha | A61G 5/0833 |
| 2025/0032335 | A1 * | 1/2025 | Van Loon | A61G 3/0875 |

FOREIGN PATENT DOCUMENTS

| | | | | |
|---|---|---|---|---|
| CN | 110051512 | A | 7/2019 | |
| CN | 211272105 | U | 8/2020 | |
| CN | 112089558 | A | 12/2020 | |
| EP | 2658501 | A | 11/2013 | |
| EP | 3912612 | A1 * | 11/2021 | A61H 3/04 |
| GB | 2538953 | A | 12/2016 | |
| JP | 2001087316 | A | 4/2001 | |
| JP | 2020-000546 | A | 1/2020 | |
| KR | 20170030565 | A | 3/2017 | |
| WO | 2012089700 | A1 | 7/2012 | |
| WO | 2015068229 | A1 | 3/2017 | |
| WO | 2020051518 | A1 | 3/2020 | |

* cited by examiner

WALKER APPARATUS WITH LIFTING PLATFORM

CROSS-REFERENCE TO RELATED APPLICATION

The present application claims the priority of U.S. Patent Application No. 63/121,009, filed on Dec. 3, 2020, the contents of which are incorporated herein by reference.

TECHNICAL FIELD

The present disclosure generally relates to support devices, and more particularly to walker apparatuses, also known as rollators, walkers, walking aids.

BACKGROUND OF THE ART

Support devices such as rollator walkers may assist senior citizens or other people with mobility difficulties in moving about their homes or other locations. The added stability offered by such devices may aid in preventing their users from falling and potentially injuring themselves. However, in case of a fall, these devices offer little to no aid in post-fall recovery, requiring the user to rely on the assistance of a third party to regain an upright position.

SUMMARY

In accordance with a first aspect, there is provided a support device comprising a frame including a base and an upright support, a seat assembly including a seating surface and connecting means for operatively connecting the seating surface to the frame, and a lifting mechanism for vertically displacing the seat assembly between a lowered position and a seating position.

Further in accordance with the first aspect, for instance, the lifting mechanism includes a battery, one or more electric motors receiving power from the battery, and one or more lead screws rotatably engaged to the one or more electric motors and operatively coupled to the seat assembly.

Still further in accordance with the first aspect, for instance, the lifting mechanism includes a single lead screw rotatably engaged to a single electric motor, the single lead screw positioned alongside one or more support shafts along a leading edge of the support device.

Still further in accordance with the first aspect, for instance, the lead screw and the one or more support shafts extend through openings in an upper portion of the seat assembly.

Still further in accordance with the first aspect, for instance, the lead screw is fastened to the seat assembly via a nut and configured to convert rotational motion from the single electric motor into linear motion of the seat assembly.

Still further in accordance with the first aspect, for instance, the battery and the single electric motor are positioned on the base below the seating assembly or on the upright support above the seating assembly.

Still further in accordance with the first aspect, for instance, the lifting mechanism includes two lead screws and two electric motors and the upright support includes two opposed vertical support structures, each of the two electric motor rotatably engaged to a respective one of the two lead screws.

Still further in accordance with the first aspect, for instance, each of the two lead screws is positioned within a respective one of the two vertical support structures and operatively connected to an end of the seating assembly.

Still further in accordance with the first aspect, for instance, each of the opposed vertical support structures includes a front vertical support member and a rear vertical support member forming a triangular vertical support structure.

Still further in accordance with the first aspect, for instance, the seat assembly includes a first seating surface hingedly connected to a second seating surface.

Still further in accordance with the first aspect, for instance, the support device is movable between an open configuration whereby the first seating surface and the second seating surface are coplanar and a folded configuration whereby the two opposed vertical support structures are approached towards each other and the first seating surface and the second seating surface are folded towards one another.

Still further in accordance with the first aspect, for instance, each of the first seating surface and the second seating surface is mounted to a respective vertical support structure via a hanger plate and a sliding block slideable through an angled channel in the respective vertical support structure.

Still further in accordance with the first aspect, for instance, one or more wheels are operatively coupled to the base.

Still further in accordance with the first aspect, for instance, a braking system is provided for selectively preventing at least one of the one or more wheels from rotating.

Still further in accordance with the first aspect, for instance, at least one additional electric motor is provided for powering at least one or more of the one or more wheels.

Still further in accordance with the first aspect, for instance, the seating surface is tiltable between a horizontal position and a vertical position relative to the base.

Still further in accordance with the first aspect, for instance, two arms surround the seating assembly.

Still further in accordance with the first aspect, for instance, the arms are tiltable between a horizontal position and a vertical position relative to the base.

Still further in accordance with the first aspect, for instance, a control panel is provided for controlling at least the lifting mechanism.

Still further in accordance with the first aspect, for instance, the control panel is removably positioned on the upright support.

In accordance with a second aspect, there is provided a summoning system for summoning a support device to a user, the support device having a plurality of wheels and a lifting mechanism for vertically displacing a seat assembly between a lowered position and a seating position, the seat assembly operatively connected to and supported by a frame, comprising a robotic control module, a wireless receiver for communicating with a user device held by the user, the wireless receiver configured for relaying a location of the user to the robotic control module, and a motorized propulsion system communicatively coupled to the robotic control module, the motorized propulsion system configured for propelling the wheels of the support device in response to a summoning request received from the user device.

Further in accordance with the second aspect, for instance, the summoning system is configured to draw power from a battery used for the lifting mechanism of the support device.

Still further in accordance with the second aspect, for instance, the motorized propulsion system comprises a plurality of electric motors, each operatively coupled to one of the plurality of wheels of the support device.

Still further in accordance with the second aspect, for instance, the wireless receiver is configured for communicating with the user device over Wi-Fi, Bluetooth, or Near-Field Communication.

Still further in accordance with the second aspect, for instance, one or more sensors are associated with the motorized propulsion system for guiding the motorized propulsion system in response to a received summoning request.

Still further in accordance with the second aspect, for instance, the one or more sensors include one or more or a camera, an ultrasonic sensor, a laser, a light detection and ranging sensor, a gyroscope, and a radar sensor.

Still further in accordance with the second aspect, for instance, a real time location system is associated with the robotic control module, wherein the real time location system is configured for gathering location data via the one or more sensors.

Still further in accordance with the second aspect, for instance, the robotic control module is configured for, in response to receiving a summoning request from the user device and instructing the motorized propulsion system to propel the support device towards a location of the user device, continuously monitoring a distance between the user device and the support device, and instructing the motorized propulsion system to begin to decrease a speed of the support device as the distance between the user device and the support device reaches a predetermined threshold.

In accordance with a third aspect, there is provided a method for operating a support device, comprising receiving, at a wireless receiver, a summoning request from a user device and a location of the user device, and propelling, via a motorized propulsion system operatively coupled to a plurality of wheels of the support device, the support device to the location of the user device.

Further in accordance with the third aspect, for instance, subsequently to the propelling, a seat assembly of the support device is vertically displaced to a ground level.

Still further in accordance with the third aspect, for instance, the propelling further comprises detecting one or more obstacles via one or more sensors and navigating the support device to avoid the one or more obstacles.

Still further in accordance with the third aspect, for instance, data associated with the detected one or more obstacles is stored in a real time location system.

Still further in accordance with the third aspect, for instance, a signal is received, from the user device, that a user has sustained an injury, and the propelling is proceeded with despite not receiving the summoning request.

Many further features and combinations thereof concerning the present improvements will appear to those skilled in the art following a reading of the instant disclosure.

DETAILED DESCRIPTION

Figure 1:
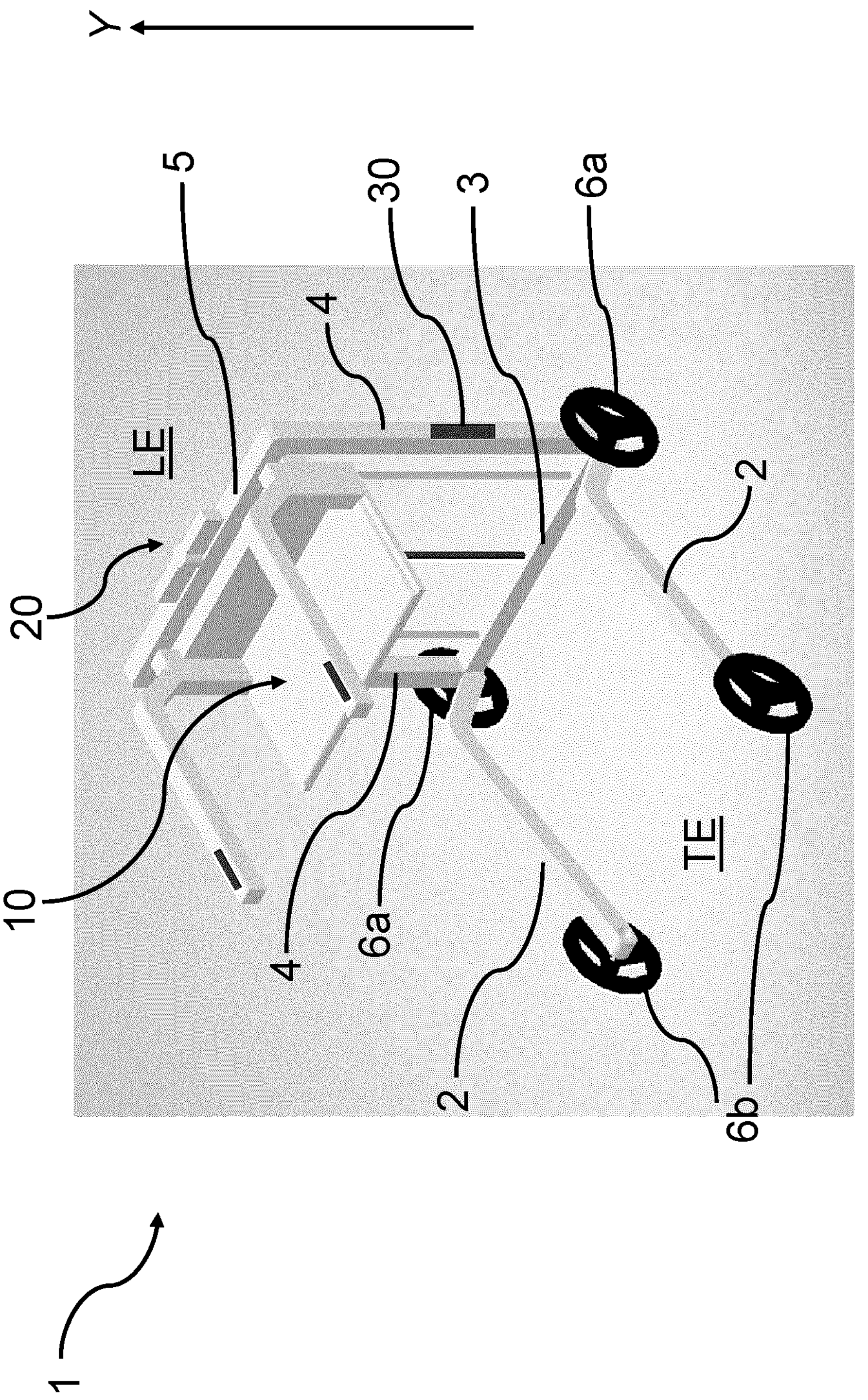
FIG. 1 is a perspective view of a support device in a fully raised position according to an embodiment of the present disclosure.

Referring to FIG. 1, a support device 1 according to an embodiment of the present disclosure is shown. As will be discussed in further detail below, the support device 1 includes a seat assembly 10 that is displaceable in upward and downward directions along a vertical axis Y via a lifting mechanism 20 and may be adapted for, among other purposes, assisting a fallen user in regaining a standing, upright or seating position with minimal or no assistance from a third party.

In the shown embodiment, the support device 1 includes a pair of legs 2 extending from a leading end LE to a trailing end TE of the support device 1. A lower horizontal support member 3 extends between the pair of legs 2 towards the leading end LE to form a U-shaped base for the support device 1. The U-shaped base is such that a user's legs may be in the U. Other arrangements for the base, for instance with additional legs and/or horizontal support members, may be contemplated as well. A pair of vertical or upright support members 4 illustratively extend upward from the junctions of the lower horizontal support member 3 and the legs 2, as a possibility, with an upper horizontal support member 5 linking the vertical support members 4 at their upper extremities. In the shown embodiment, the upper horizontal support member 5 is integrated with the vertical support members such that the upper horizontal support member 5 and the vertical support members 4 form a single unitary structure. In other cases, the upper horizontal support member 5 may be a distinct element that is removably or non-removably fixed to the vertical support members 4, for instance via fasteners. The legs 2 and various support members 3, 4, 5 form a frame of the support device 1.

The support device 1 may include a plurality of wheels 6 to enable the displacement of the support device 1 along a surface, illustratively a pair of front wheels 6*a* at the leading end LE and a pair of rear wheels 6*b* at the trailing end TE. In the shown embodiment, each front wheel 6*a* is positioned at a leading end of a corresponding leg 2, while each rear wheel 6*b* is positioned at a trailing end of a corresponding leg 2. The number of wheels 6, sizing of each wheel 6 as well as functionality of each wheel may vary. For instance, each wheel 6 may alternate between a forward position and a swivelling position wherein the wheel 6 can swivel or pivot up to 360 degrees, allowing the support device to turn. Various mechanisms may be contemplated to alternate and lock the wheels in their respective forward and swivelling positions. In another embodiment, the support device 1 is without wheels. In another embodiment, there are wheels only at the leading end LE, or only at the trailing end TE. Low friction pads, i.e., skis, may be provided when wheels are absent.

Figure 2:
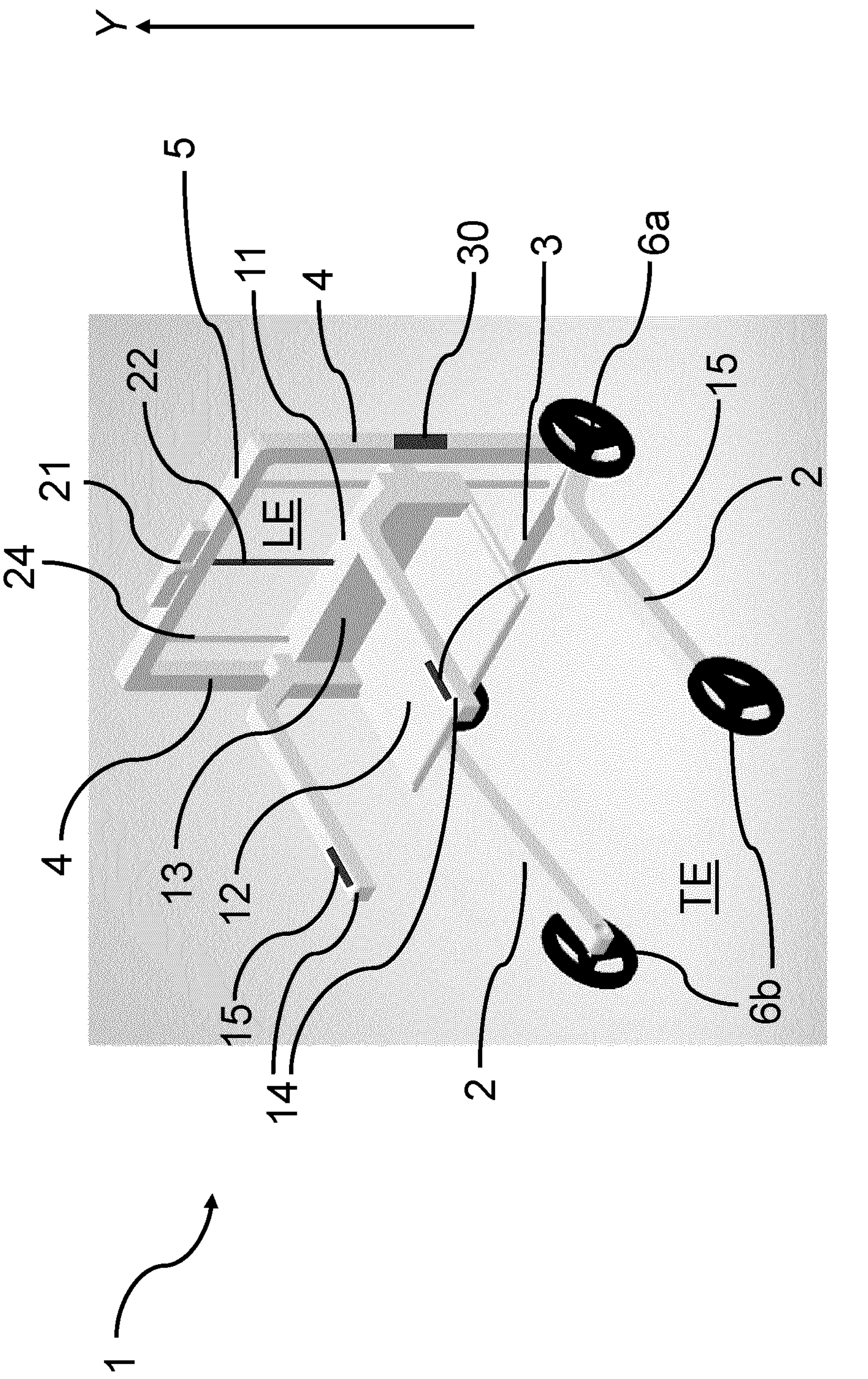
FIG. 2 is a perspective view of the support device of FIG. 1 in a partially lowered position.
Figure 3:
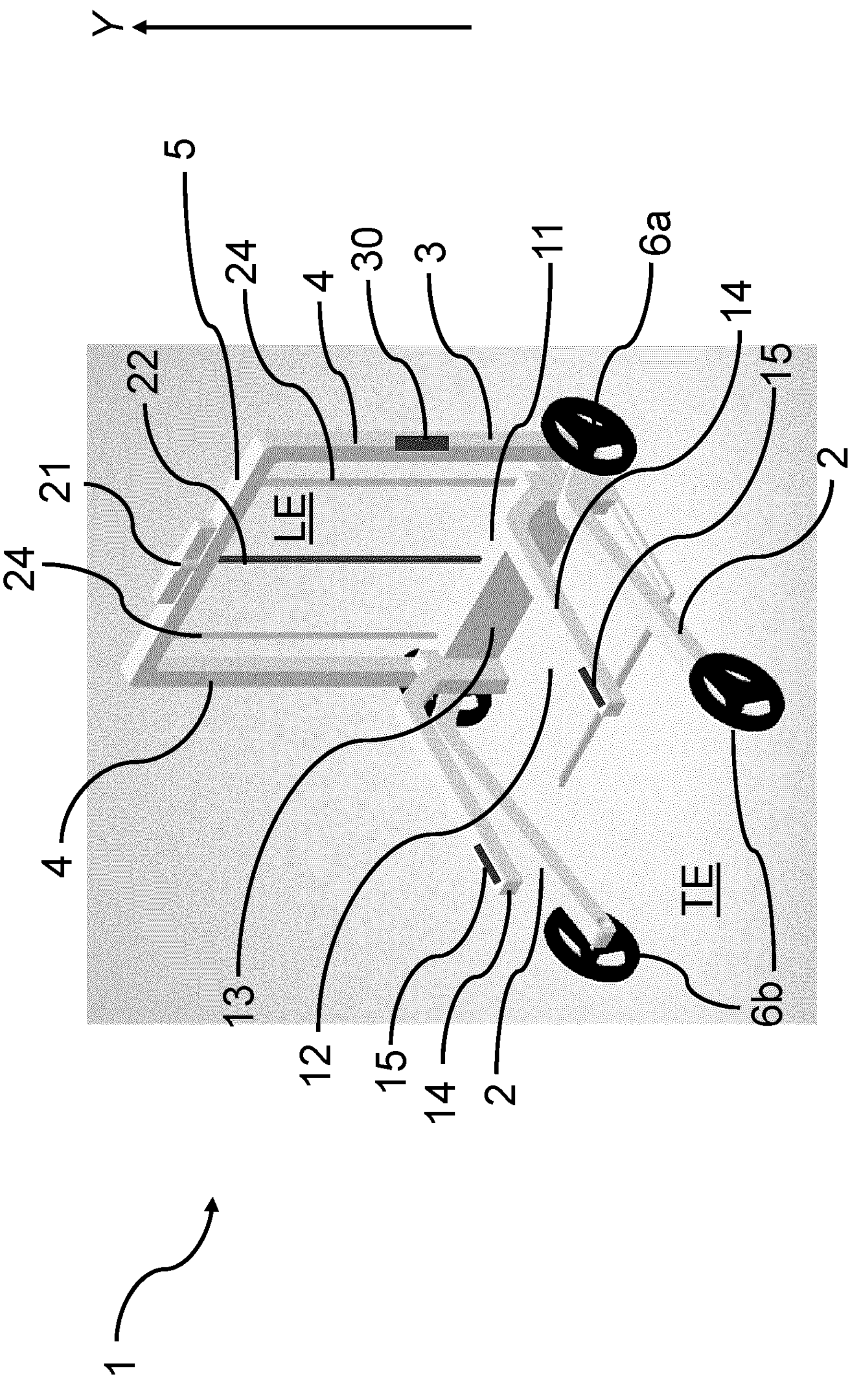
FIG. 3 is a perspective view of the support device of FIG. 1 in a fully lowered position.
Figure 4:
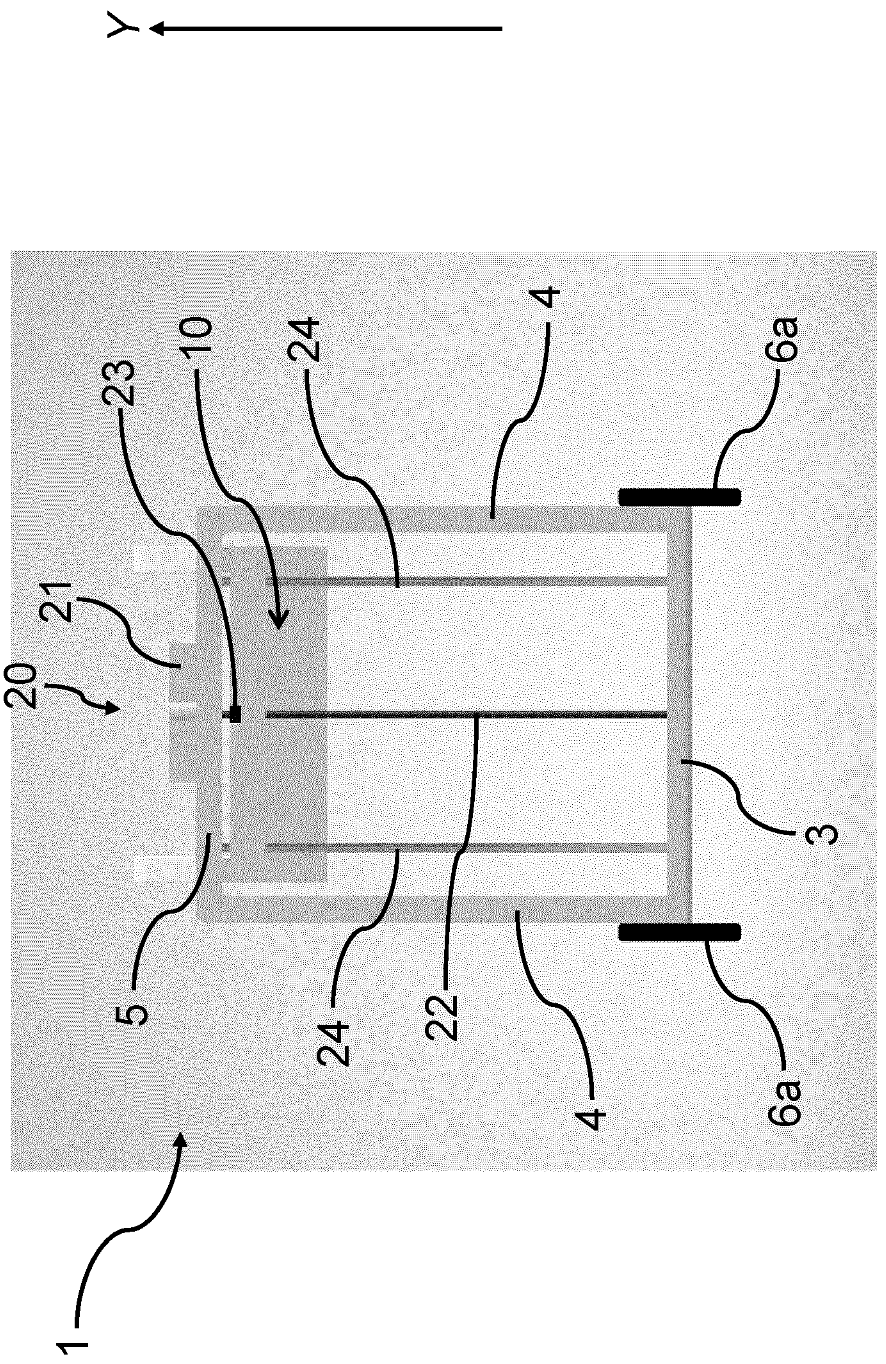
FIG. 4 is a rear view of the support device of FIG. 1 in a fully raised position.

Referring to FIGS. 2-4, the shown seat assembly 10 includes an upper portion 11 connecting the seat assembly 10 to the lifting mechanism 20, a seating surface 12 for supporting a user, and a vertical portion 13 for joining the upper portion 11 to the seating surface 12 in an L-shaped arrangement (the upper portion 11 and the vertical portion 13 may be viewed as a single component as well). As will be discussed in further detail below, this L-shaped arrangement may allow the seating surface 12 to fully descend to the ground when the seat assembly 10 is lowered by the lifting mechanism 20, facilitating a user's usage of the support device 1 after a fall. Other arrangements for operatively connecting the seating surface 12 to the lifting mechanism 20 may be contemplated as well. In the shown case, the seating surface 12 includes bevelled edges and is made from a smooth material to minimize the risk of injury when used by a user.

The seat assembly 10 further includes a pair of arms 14 attached to the seating surface 12 and/or the vertical portion 13. As will be discussed in further detail below, in various embodiments the arms 14 may be hingedly attached to the seating surface 12 and/or the vertical portion 13 such that one or both of the arms 14 may be tilted between a lowered position (as shown in FIGS. 1-4) and an upright position (see FIGS. 5-6). The hinging may be about other directions as well, i.e., the arms could pivot about a vertical axes for example. In some cases, one or both of the arms 14 may be fully removable as well. One or both of the arms may include a brake lever 15 for applying a braking force against the wheels 6, for instance the rear wheels 6*b*. Brake cable(s) (not shown) may extend from one or more brake levers 15 to the applicable wheel(s) 6. In an embodiment, the brake cable(s) may pass through the frame of the support device 1, for instance through an arm 14, a vertical support member 4 and a leg 2, and exit at the applicable wheel(s) 6. Other means for applying a braking force against the wheels may be contemplated as well, for instance through the control panel 30, as will be discussed in further detail below. In an embodiment, some of the wheels are normally blocked, and a contact must be made with the lever 15 to release the brakes.

In various cases, the support device 1 may be folded or collapsed, for instance to facilitate its transport or storage. For example, the legs 2 may be hingedly connected to the lower horizontal support member 3, for example via a locking pin. In such a case, the legs 2 may fold, bringing the rear wheels 6*b* upward towards the upper horizontal support member 5, reducing the overall footprint of the support device. The arms 14 may also be tilted upwards when folding the support device 1. Other folding means may be contemplated as well. For instance, the support device 1 may be partially foldable or collapsible to occupy a narrower footprint and be usable in narrower spaces, for example through hallways or the like.

In the shown embodiment, the lifting mechanism 20, also referred to as an actuator assembly or power assembly, includes a motor and battery assembly 21 positioned above the upper horizontal support member 5 for selectively raising and lowering the seat assembly 10. It is to be understood that in other embodiments the positioning of the motor and battery assembly 21 may vary, as will be discussed in further detail below. Illustratively, the motor and battery assembly 21 is positioned towards the center of the upper horizontal support member 5 with reference to the pair of vertical support members 4. In various embodiments, the motor and battery assembly 21 may include a DC electric motor and one or more rechargeable batteries, although other motor and battery types may be contemplated as well. In the present case, the battery is a lithium-ion based battery, although other batteries such as nickel-based batteries or nano-diamond-based batteries may be contemplated as well. In various cases, the one or more batteries may be easily removed from the motor and battery assembly 21, replaced with a fully charged battery and recharged externally for future use, thus allowing for continuous use of the support device 1. In other cases, the batteries may be charged without being removed from the device 1. In an alternate embodiment, the lifting mechanism 20 may include an AC electric motor powered via a power cord to be plugged into a power outlet. In such an embodiment, the power cord may be housed within the frame of the support device 1, for instance in a dedicated compartment within one of the support members. As such, the power cord may withdraw and retract as the support device 1 displaces further from and closer to the power outlet. As will be discussed in further detail below, the operation of the lifting mechanism may be controlled via the control panel 30.

In the shown embodiment, the motor and battery assembly 21 is operatively connected to the seat assembly 10 via a lead screw 22. The lead screw 22, also referred to as a power screw, is vertically disposed between the upper horizontal support member 5 and lower horizontal support member 3. The lead screw 22 is bi-directionally drivable by the motor and battery assembly 21. In the shown case, the lead screw 22 passes through an opening in the upper portion 11 of the seat assembly 10 and is fixed to the upper portion 11, for instance via a nut 23 secured to the seat assembly 10, although other fastening means may be contemplated as well. The lead screw 22 and nut 23 (e.g., ball screw unit) are configured to convert rotational motion from the motor and battery assembly 21 into linear motion in an upward or downward direction relative to the Y axis. As such, rotation of the lead screw 22 causes the seat assembly 10 to vertically displace between a lowered position and a raised or seating position, depending on the direction of rotation of the lead screw 22. For instance, in the lowered position the seating surface 12 may be resting on the ground, while in the raised position the seating surface 12 may reach a height of twenty-six inches off of the ground, although other heights may be contemplated as well. The lifting mechanism 20 is also configured to raise or lower the seat assembly 10 to various positions between its raised or lowered positions.

While the shown lifting mechanism includes a single lead screw 22 driven by a motor and battery assembly 21 having a single motor, other configurations may be contemplated as well. For instance, in some cases two or more lead screws 22, each driven by a respective motor or a single motor operatively connected to each lead screw (e.g. via a gearing system) may be provided, whereby each lead screw is fixed to the seat assembly 10 and may rotate in concert to selectively raise or lower the seat assembly 10. Other types of lifting mechanisms may be contemplated as well, for instance a ball screw system, a pneumatic lifting system, a rack and pinion lifting system, and/or a scissor lifting system.

In the shown embodiment, the lifting mechanism 20 further includes a pair of vertical support shafts 24 extending from the upper horizontal support member 5 to the lower horizontal support member 3. Illustratively, the two support shafts 24 are positioned on either side of the lead screw 22, although other numbers and arrangements for the support shafts 24 may be contemplated as well. Each support shaft 24 may pass through a cylindrical bore (not shown) in the seat assembly 10, illustratively in the upper portion 11. In various cases, a sleeved collar, bearing, or linear ball bushing (not shown) may be used to slideably join each support shaft 24 to the seat assembly 10. Such bores may be sized so that the support shafts 24 provide support to the seat assembly 10 in motion yet do not impede the seat assembly's 10 vertical motion due to friction. In use, the support shafts 24 may accept the bending moment imparted onto the lead screw 22 from the seat assembly 10, maintaining an axial load placed directly onto the lead screw 22. The support shafts 24 may be made from aluminum tubing, although other materials may be contemplated as well. In another embodiment, the support shafts 24 may structurally support the support device 1 in addition to supporting the seat assembly 10. In such an embodiment, the support device 1 may do without the vertical support members 4 as their supporting function would be carried out by the support shafts 24. Oher arrangements may be contemplated as well.

As discussed above, the actuation of the motor and battery assembly 21 may be done via the control panel 30. In the shown embodiment, the control panel 30 is mounted roughly halfway up one of the vertical support members 4, although other locations on the support device 1 may be contemplated as well. The control panel 30 may resemble a remote control and include a screen displaying different information relating to a status of the support device 1, for instance the positioning of the seat assembly 10, the remaining charge in the battery, and the locked/unlocked status of the different wheels 6. The control panel 30 may further include different buttons to control various functions of the support device 1. For instance, there may be buttons to power the support device 1 on or off, to raise the seat assembly 10, to lower the seat assembly 10, to lock/unlock one or more of the wheels 6, to control the brightness of the screen, and/or to call for assistance, for instance via an integrated networking module capable of communicating via Wi-Fi, Bluetooth and/or cellular network. In some cases, the control panel 30 may include a microphone and/or speaker to allow a user to speak to an operator or emergency contact via the networking module in case of a fall. Alternatively, the control panel 30 may include a touchscreen display capable of receiving touch inputs to control its various functions. In other cases, more than one control panel 30 may be provided with the support device 1, for instance one towards the upper horizontal support member 5 and one towards the lower horizontal support member 3. In some cases, one or more of the control panels 30 may be integrated into the support device 1. In other cases, a mobile device (not shown) such as a smartphone or tablet may act as a control panel 30 and communicate with the lifting mechanism 20 via the networking module, for example over Wi-Fi, Bluetooth, or Near Field Communication (NFC). Other control panel 30 functions may be contemplated as well. For instance, the device 1 may include additional sensors operatively connected to the control panel 30 and configured for tracking various parameters related to the operation of the device 1. Such parameters may include, for instance, the number of raising and/or lowering cycles of the seat assembly 10, or the distance traveled by the device 1. The control panel 30 may be configured for storing and displaying such data, and communicating said data with an external device for analysis. Various sensors may be used to track said data. In a particular embodiment, an accelerometer may be used to detect when the seat assembly 10 is being raised or lowered, while one or more rotation sensors may be used at the wheels 6 to monitor the distance travelled by the device 1. Other sensors and parameters may be contemplated as well.

In some cases, the control panel 30 may be removable from the support device 1, for instance so that a fallen user may grab the control panel 30 and activate various functions. The control panel 30 may be retained in a slot on the vertical support member 4 and removed from the slot when needed. Alternatively, a non-permanent adhesive such as Velcro™ strips may be used to non-removably attach the control panel 30 to the vertical support member 4 so that a user may easily remove and replace the control panel 30. In some cases, the control panel 30 may be tethered to the support device 1 via a wire or cable, for instance a telephone-style wire. Such a wire may ensure the control panel 30 is not inadvertently misplaced and/or allow the control panel 30 to be used to transmit data between the control panel 30 and the motor and battery assembly 21. Alternatively, the control panel 30 may be untethered and communicate wirelessly with the motor and battery assembly 21. In such cases, the control panel 30 may be equipped with an audio alarm that can be activated by a button on the support device 1 if the control panel 30 were to be misplaced. Other attachment means for the control panel 30 may be contemplated as well.

As discussed above, the wheels 6 include brakes that may be activated by the brake lever(s) 15 and/or the via the control panel 30. In some cases, the control panel 30 may automatically lock some or all four wheels 6 when a user activates the seat assembly's 10 raise or lower function. For instance, as soon as the lifting mechanism 20 engages and the seat assembly 10 begins to either raise or lower, the control panel 30 may automatically lock some or all of the wheels 6. In other cases, the lifting mechanism 20 may not be engageable, i.e., the seat assembly 10 may be prevented from being raised or lowered, until the brakes are engaged, for instance by the control panel 30. In various cases, the brakes may be unlocked at any height of the seat assembly 10 along the Y axis as long as the seat assembly 10 is not in motion, i.e., the lifting mechanism 20 is not engaged. The control panel 30 may also include specific means, for instance a button, for locking some or all of the wheels 6. The brake lever(s) 15, which in some cases may resemble the brake levers on a bicycle, may be activated (e.g. squeezed) to arrest some or all of the wheels 6. For instance, the brake lever(s) 15 may only brake the rear wheels 6*b*, whereas the control panel 30 may have options to lock only the rear wheels 6*b*, only the front wheels 6*a*, and/or all four wheels 6. Other braking means may be contemplated as well, for instance a reverse braking-based system or manually operated brakes accessible from the floor (similar to those found on manual wheelchairs).

Figure 5:
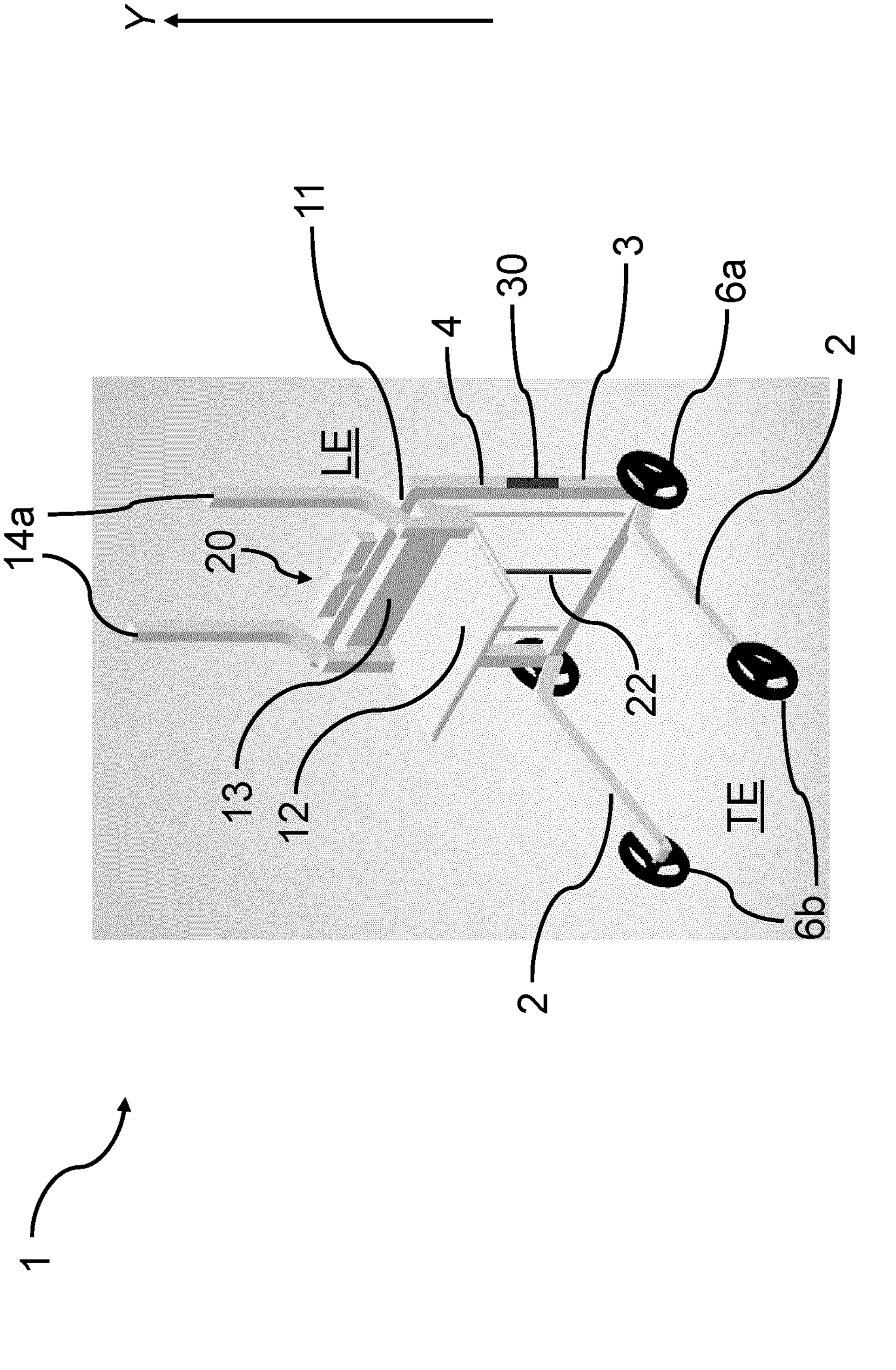
FIG. 5 is a perspective view of the support device of FIG. 1 in a fully raised position with both arms in a raised tilted position.
Figure 6:
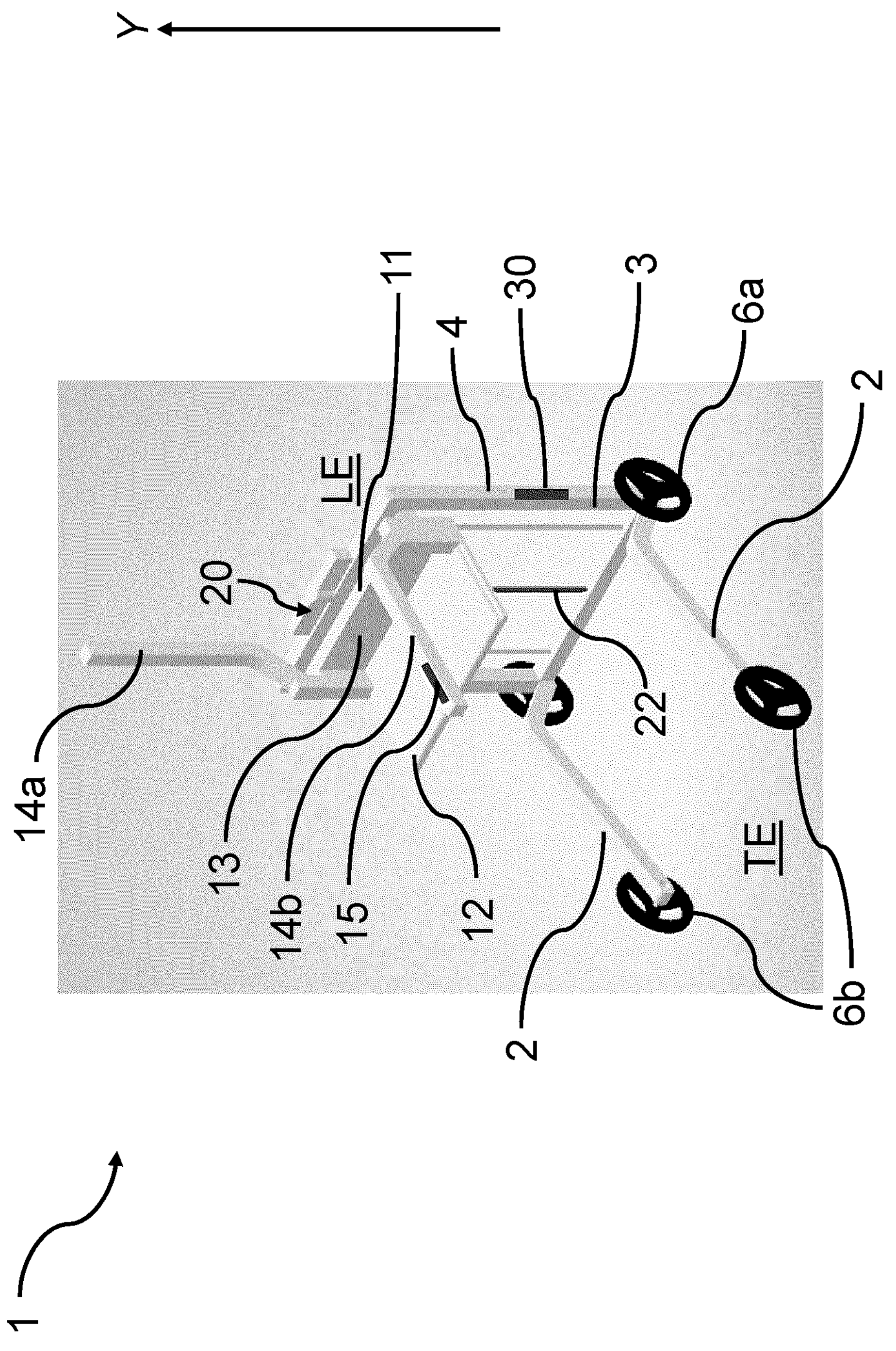
FIG. 6 is a perspective view of the support device of FIG. 1 in a fully raised position with one arm in a raised tilted position.

Referring to FIGS. 5 and 6, as discussed above the arms 14 may be connected to other portions the seat assembly 10, illustratively the seating surface 12 and the upper portion 11, in a hinged fashion to allow one or both of the arms 14 to tilt between a raised arm position 14*a* and a lowered arm position 14*b*. The hinged connection point may include a locking mechanism to lock the arms in their respective raised 14*a* and lowered 14*b* positions, for instance via a spring-pin mechanism that a user may activate when a position change is desired. Other locking mechanisms may be contemplated as well. In some embodiments, the arms 14 may include an additional handle, pull tab or other like feature to assist a user in tilting an arm 14 from a raised arm position 14*a* to a lowered arm position 14*b*.

In various cases, with the seat assembly 10 in a fully lifted position (as shown in FIGS. 1, 4, 5 and 6), the support device 1 may be used as a rollator walker. With the arms 14 locked in their lowered positions 14*b*, a user standing at the trailing end TE of the support device 1 and facing the leading end LE can hold the arms 14 in their hands and push the support device 1 as they walk. The wheels 6 roll as the user pushes the support device 1, and as such the support device 1 offers the user added stability and reduces the risk of a fall. In this rollator walker mode, the rear wheels 6*b* may be locked in a forward rolling mode while the front wheels 6*a* may be allowed to pivot or swivel, allowing the user to easily change direction as they walk with the support device. The brake lever(s) 15 on one or both of the arms 14 may be activated to brake the wheels 6, for instance to help bring the support device 1 to a stop or to prevent the support device 1 from gaining excessive speed on an inclined slope. As discussed above, the brake lever(s) may be connected to all four wheels or only the rear wheels 6*b*. The user may adjust the height of the arms 14 to suit their preference by raising or lowering the seat assembly 10 via the control panel 30. In other cases, the distance between the arms 14 and the seat assembly 10 may be adjusted, for instance via locking pins or other such mechanisms. Such distance may, for instance, be adjusted based on the user's preference or as prescribed by a clinical expert. Other walker modes may be contemplated as well, for instance in cases where the support device includes no wheels, or wheels only at the leading end LE or at the trailing end TE.

If a user were to fall to the ground and be unable to regain an upright position on their own, for instance due to age, disability, limited function or previous injury, the support device 1 may be used to aid the user in regaining an upright position with minimal to no assistance from a third party. Such a fall may or may not occur when the user is already using the support device 1, for instance in its rollator walker mode. Various other factors or circumstances may lead to the user falling as well. When such a fall occurs, the user should first ensure that they did not endure a serious injury that would prevent them from safely using the support device 1. In some cases, the support device 1 may include a laminated card in an attachable sleeve (not shown) with post-fall injury assessment instructions, as well as instructions for the proper usage of the support device 1. For instance, to be able to use the support device 1, the user should be able to maintain dynamic sitting balance and stabilized trunk control in a seated position and have appropriate motor control, strength and coordination, and cognitive function to access and manipulate the control panel 30.

If the user has not sustained any serious injuries that would prevent them from moving themselves across the ground, the user may crawl, hip hike or otherwise displace themselves across the ground towards the nearby support device 1. Then, the user would access the control panel 30, for instance by removing it from the vertical support member 4. Alternatively, the user may open a mobile application on their mobile device to communicate with the support device 1, as discussed above. With the control panel 30, the user may activate the lifting mechanism 20 to lower the seat assembly 10, as discussed above. Such activation may lock the wheels 6 in place to prevent the support device 1 from moving before the seat assembly 10 begins to lower and until the user has fully regained an upright position.

The lifting mechanism 20 may lower the seat assembly 10 until the seating surface 12 has fully reached the ground, allowing the user to easily displace themselves to sit on the seating surface 12. The user may use the arms 14 to assist them in positioning themselves on the seating surface 12. Once the user has found a stable and balanced sitting position, for instance by leaning against the vertical portion 13 and/or resting one of their arms on an arm 14, the user may activate the lifting mechanism 20 via the control panel 30 to raise the seat assembly 10 until the user has reached a sufficient height to stand up. To do so, the user may lean forward towards the trailing end TE and use the arms 14 for leverage as they stand up. Alternatively, the user may raise one of the arms to its upright position 14*a* to transfer to another seating surface of an equivalent or lower height from one of the sides. In some cases, another person may assist the user in reaching the support device 1 or manipulating the control panel 30 without needing to aid the user in actually regaining their upright position. It is to be understood that the user, when using the support device 1 to regain an upright position, will typically select a height for the seating surface 12 where their legs are only slightly bent, requiring a modest push to reach the fully upright position. As the user raises the seating surface 12 past the point where their legs form a 90-degree angle at the knee, it will become less and less difficult to regain the upright position from the support device 1.

In various cases, with the seat assembly 10 in a partially lowered position (as shown in FIG. 2), the support device 1 may be used as a wheelchair. To enable this mode, a user may install optional foot rests (not shown) on the legs 2 and activate the lifting mechanism 20 via the control panel 30 to raise or lower the seat assembly 10 to a suitable height so that the user may comfortably sit on the seating surface 12 with their feet resting on the foot rests. In addition, an optional back rest (not shown) may be installed adjacent the vertical portion 13 for added comfort. Moreover, optional push handles (not shown) may be installed on the upper horizontal support member 5 or the vertical support members 4, protruding towards the leading end LE. Alternatively, the optional back rest may include integrated push handles. Such push handles may allow an additional person to push the support device 1 while the user is in a seated position. Various other optional attachments may be provided as well, for instance a tray, a basket or a holder for various devices. When the support device 1 is in its wheelchair mode, the front wheels 6*a*, acting as the rear wheels of the wheelchair, may be locked in a forward position while the rear wheels 6*b*, acting as the front wheels of the wheelchair, may be permitted to swivel, allowing the wheelchair to be used as intended. If a user wishes to regain an upright position after sitting in the wheelchair, they may utilize the lifting mechanism 20 functionality as described above.

In various cases, a user may use the support device 1 in other situations to facilitate various day-to-day tasks and prevent injuries such as falls. For instance, rather than bending down to reach an object on a low shelf, a user may sit on the seating surface 12, lower themselves via the lifting mechanism 20 through the control panel 30, reach the desired object, and subsequently use the lifting mechanism 20 to regain their upright position. In other cases, a user may use the support device 1 in a similar fashion to lower themselves to get into their bed. In such a case, the user may wish to align the support device 1 with one arm 14 and one leg 2 positioned next to the bed, lower themselves to a suitable height to slide themselves onto the bed, and raise the arm 14 to its upright position 14*a* to ease the transition. In the shown case, the bevelled edges of the seating surface 12 may ease the user in sliding on and off of the seating surface 12. Other situations where the support device 1 may be used to aid a user in raising and lowering themselves to different heights may be contemplated as well. For instance, the support device 1 may be used to assist a user in getting on and off of various seating surfaces, to allow the user to perch comfortably while performing tasks for an extended duration of time, and to practice light hobbies.

Figure 7:
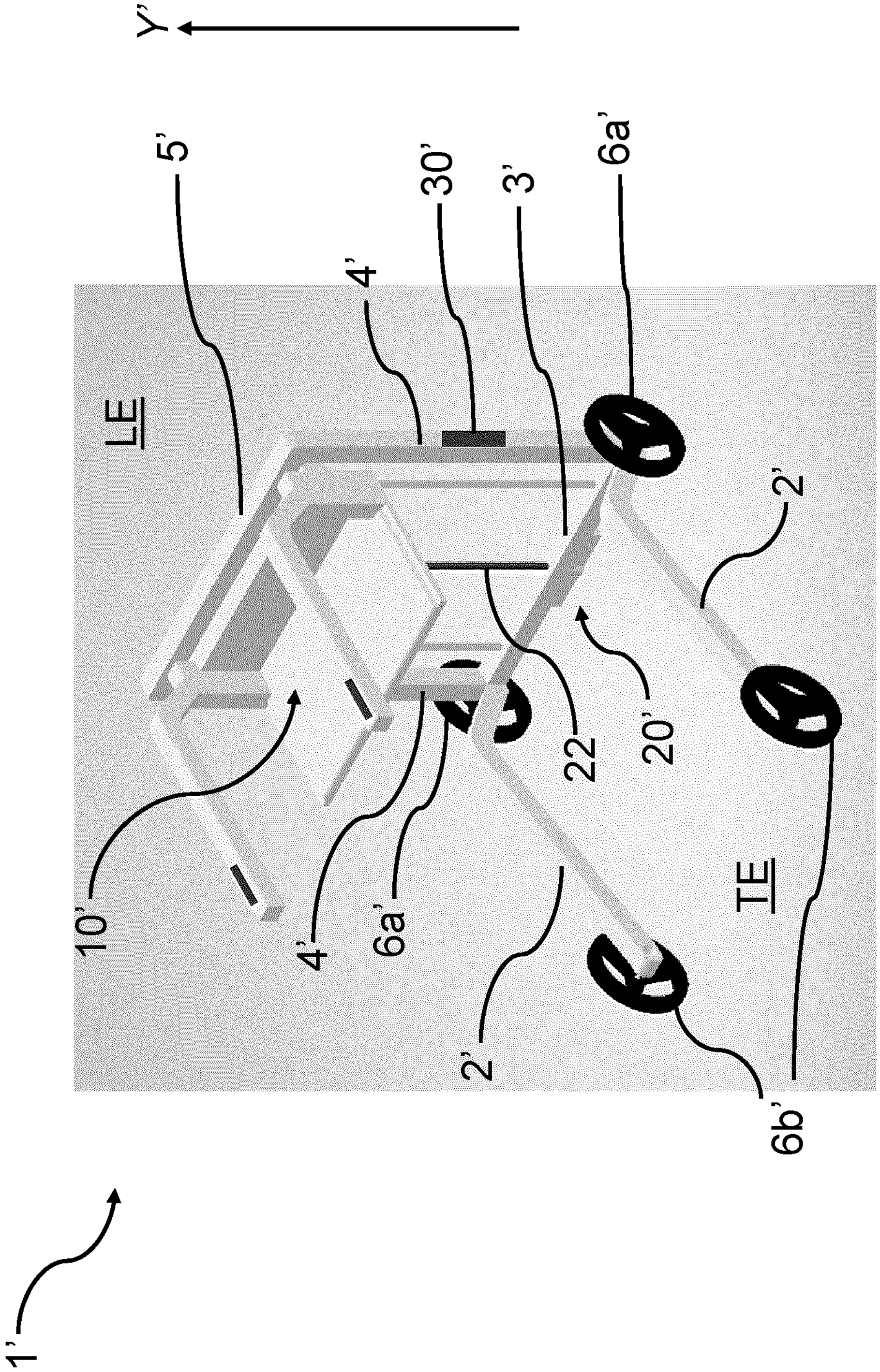
FIG. 7 is a perspective view of a support device in a fully raised position according to another embodiment of the present disclosure.
Figure 8:
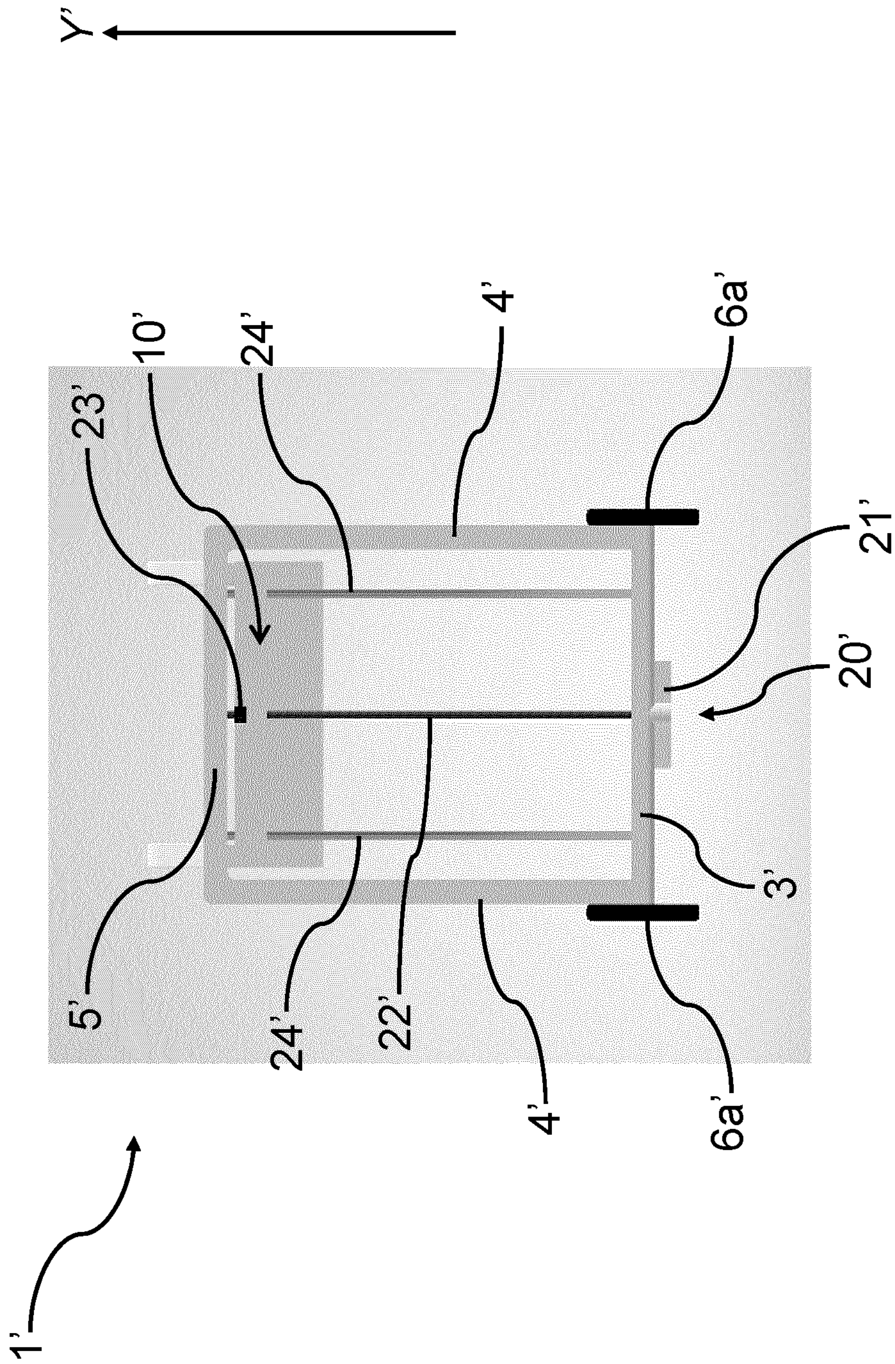
FIG. 8 is a rear view of the support device of FIG. 7 in a fully raised position.

Referring to FIGS. 7 and 8, in another embodiment, a support device 1' includes a lifting mechanism 20' positioned underneath the lower horizontal support member 3'. In such an embodiment, the motor and battery assembly 21' is operatively coupled to the lower end of the lead screw 22' and is configured to rotatably drive the lead screw 22' to raise or lower the seat assembly 10'. In such an embodiment, the center of gravity of the support device 1' is lower along the Y' axis due to the positioning of the motor and battery assembly 21'.

Figure 9:
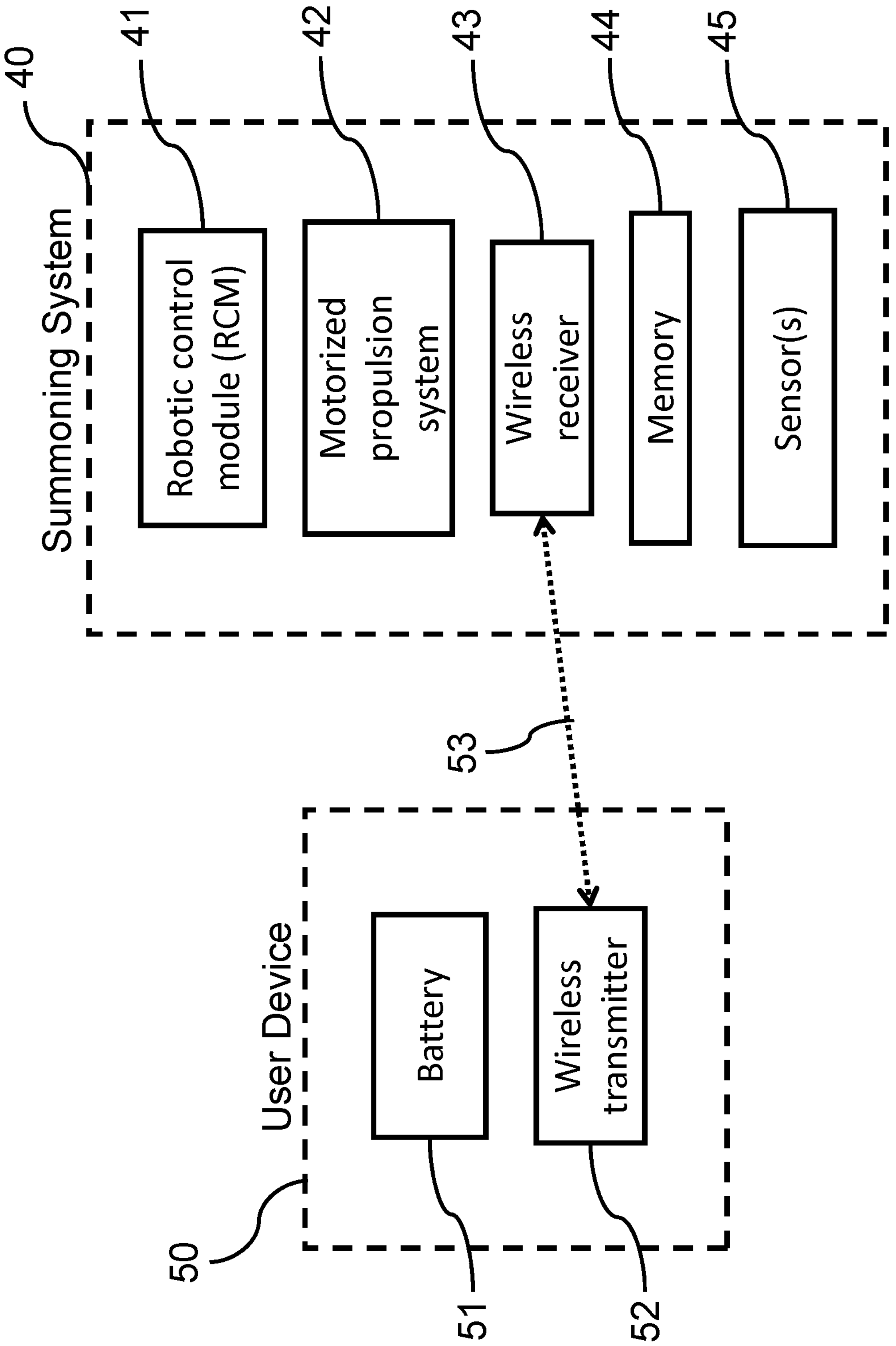
FIG. 9 is a block diagram of a support device summoning system interacting with a user device according to an embodiment of the present disclosure.

Referring to FIG. 9, in another embodiment the support device 1 may include a summoning system 40. In such an embodiment, a user located on a same floor as the support device 1 within a building, for instance their home, may summon the support device 1 via the summoning system 40 by activating a suitable function on a user device 50. When summoned, the summoning system 40 is then operable to drive the support device 1 to the location of the user so that the user may utilize the support device 1, for instance to help the user regain a standing position after a fall. The summoning system 40 may also be utilized in other cases, for instance if a user wishes to get on or off a given seating surface. The nature of the user device 50 may vary, as will be discussed in further detail below. The summoning system 40 may draw power from the motor and battery assembly 21 in the lifting mechanism, or alternatively may include its own distinct power source such as an additional battery.

In the shown case, the summoning system 40 includes a robotic control module (RCM) 41 in communication with a motorized propulsion system 42. In some cases, the robotic control module 41 may be integrated with the lifting mechanism 20 and control panel 30, although a distinct module may be contemplated as well. The motorized propulsion system 42 controls some or all of the wheels 6 to drive the support device 1 to the user's location once summoned. In various cases, the motorized propulsion system 42 may include electric motors (not shown) operably connected to some or all of the wheels 6, for instance positioned adjacent to each wheel on a given leg 2. These electric motors may draw power from the lifting mechanism's 20 motor and battery assembly 21, or alternatively may be powered by an additional battery for the summoning system 40. To steer the support device 1, the motorized propulsion system 42 may include means to control the direction of some or all of the swivelling wheels 6. Alternatively, steering of the support device 1 may be done by simultaneously rotating certain wheels 6 in opposite directions. In some cases, the motors included in the motorized propulsion system 42 may assist in braking the support device 1, for instance by driving the wheels 6 in the opposite direction of travel and/or via regenerative braking. Friction and/or inertia may suffice in stopping movement of the support device 1 once the motors are stopped. In the latter case, any captured energy may be supplied to the motor and battery assembly 21 or to the motorized propulsion system's own battery unit to provide additional battery life. In other cases, the motorized propulsion system 42 may include an additional wheel (not shown) that is deployable and retractable as required from an additional arm (not shown) attached to the base of support device 1 and operable to propel the support device 1 to the user when summoned. Other propulsion means may be contemplated as well.

The summoning system 40 further includes a wireless receiver 43 for communicating with the user device 50. As will be discussed in further detail below, the user device 50 may include a battery 51 or other such power source and a wireless transmitter 52 for communicating with the wireless receiver 43, for instance via Wi-Fi, Bluetooth, or Near-Field Communication (NFC), among possibilities. In some cases, the wireless receiver 43 may be integrated with the networking module associated with the control panel 30, or alternatively the wireless receiver 43 may be its own unit integrated with the support device 1. Passive data transmission means may be contemplated as well, as will be discussed in further detail below.

If a user wishes to summon the support device 1, for instance after experiencing a fall, they may activate the user device 50, for instance via a button, causing the wireless transmitter 52 to send data 53 to the wireless receiver 43. The transmitted data 53 may include a code indicating that the support device 1 is to be summoned, as well as information relating to the user's location in relation to the support device 1. This location information is interpreted by a real time location system (RTLS) associated with the robotic control module 41. For instance, the real time location system may derive from the transmitted data 53 a vector including a distance and direction between the support device 1 and the user device 50. In some cases, the transmitted signal may be bidirectional. For instance, the summoning system 40 may send a confirmation signal to the user device 50 indicating that a summon request has been successfully received. In other embodiments, triangulation with a WIFI hub, GPS, are solutions to locate the support device 1 and the user device 50. Other communication and position determining methods may be contemplated as well.

The summoning system 40 may further include memory storage 44, for instance random access memory (RAM), read-only memory (ROM), Programmable read-only memory (PROM), Electrically erasable programmable read-only memory (EEPROM) and/or flash memory. Such memory may be used, for instance, to store current and/or previously-received location data from the user device 50. The summoning system 40 further includes one or more sensors 45 to aid in navigating the motorized propulsion system 42. In an embodiment, such sensor(s) 45 may include, for instance, one or more cameras, ultrasonic sensors, lasers, light detection and ranging (LIDAR), gyroscopes, radars, and combinations thereof. The sensor(s) 45 may be disposed, for instance, about the perimeter of the base of the support device 1, i.e. along the legs 2 and the lower horizontal support member 3, although other positions for the sensor(s) 45 may be contemplated as well.

The real time location system may gather information about its environment via the sensor(s) 45, for instance the location of hazards to avoid such as walls, large objects and staircases, to ensure the support device 1 arrives at the user without hindrance. Such information, for instance a digitized two-dimensional floor plan of the user's home or other such space, may be stored in the memory 44 and later relied upon for future trips to the user. For instance, the real time location system may cross-reference the user's location data included in the transmitted data 53 with the digitized floor plan stored in the memory 44 to map out a direct route to the user that avoids any obstacles, with the sensor(s) 45 constantly updating the stored information when new obstacles are detected. Information from the sensor(s) 45 may be used to determined how to best avoid the obstacles. For instance, in some cases an obstacle may be small enough in stature that the device 1 may be able to roll over it, i.e., with suitable clearance, while in other cases the device 1 may need to navigate around a larger obstacle to avoid it. In various cases, the real time location system may apply a search methodology to set a path to the user's location in the most efficient manner possible while the sensor(s) 45 aid in avoiding unpassable routes. In the absence of a digitized floor plan or other such environmental information, the real time location system would rely on the sensor(s) 45 to avoid any obstacles as the support device 1 navigates towards the user. Other means for navigating to the user while avoiding obstacles may be contemplated as well. In some cases, the device 1 may be configured for automatically contracting or folding to narrow its overall width, for instance via the motor and battery assembly 21 (or via one or more additional motors). In such cases, the summoning system 40 may be configured for automatically narrowing the width of the device 1 based on its location in order to navigate through a narrow space, such as a doorway or corridor.

As discussed above, the user device 50 may include a battery 51 and a wireless transmitter 52 for transmitting data 53 such as the location of the user device 50 to the summoning system 40. The user may activate the user device 50 by pressing a button on the user device 50, for instance if the user falls or wishes to transfer from one seating surface to another. In other cases, the user device 50 may be operable to activate the wireless transmitter 52 in response to voice commands. The user device 50 may further include one or more sensors such accelerometers and/or gyroscopes to enable fall detection, and may automatically transmit data 53 to the summoning system 40 in case of such a fall, or prompt a user's response to confirm that the support device 1 should move toward the user device 50.

Various preferences for the user device 50 may be controlled via the control panel 30. In other cases, the user device 50 may include its own controls to vary different settings, for instance to activate or deactivate the automatic summoning feature in case a fall is detected. In addition, the user may have the option to cancel an automatic summon signal after a fall has been detected if the user judges that the support device 1 is not required. The user device 50 may include other networking means to alert a third party of such a fall. In other cases, the user device 50 may be integrated into a smartphone, tablet or wearable device such as a smartwatch and be controllable via a mobile application. In such cases, the smartphone or wearable device's existing communication features, voice activation capabilities and/or sensors may be used for the purposes of the summoning system, for instance to transmit data 53 and/or to detect a fall.

In various cases, the summoning system 40 may be operable to decelerate as it approaches the user's location to avoid a potential collision. Various settings may be available to control the support devices' 1 arrival speed and distance from the user, for instance through the control panel 30 or via a mobile application. For instance, in the case of a fall, it may be preferable that the support device 1 stops a meter away from the user to avoid any risk that the support device 1 runs into the fallen and potentially injured user. Alternatively, if the user wishes to transfer from one seating surface to another, they may wish for the support device 1 to stop closer to them. The support device 1 may evaluate these distances via the user's location information provided in the transmitted data 53 and/or via information provided by the sensor(s) 45. Other stopping distances may be contemplated as well.

Figure 10A:
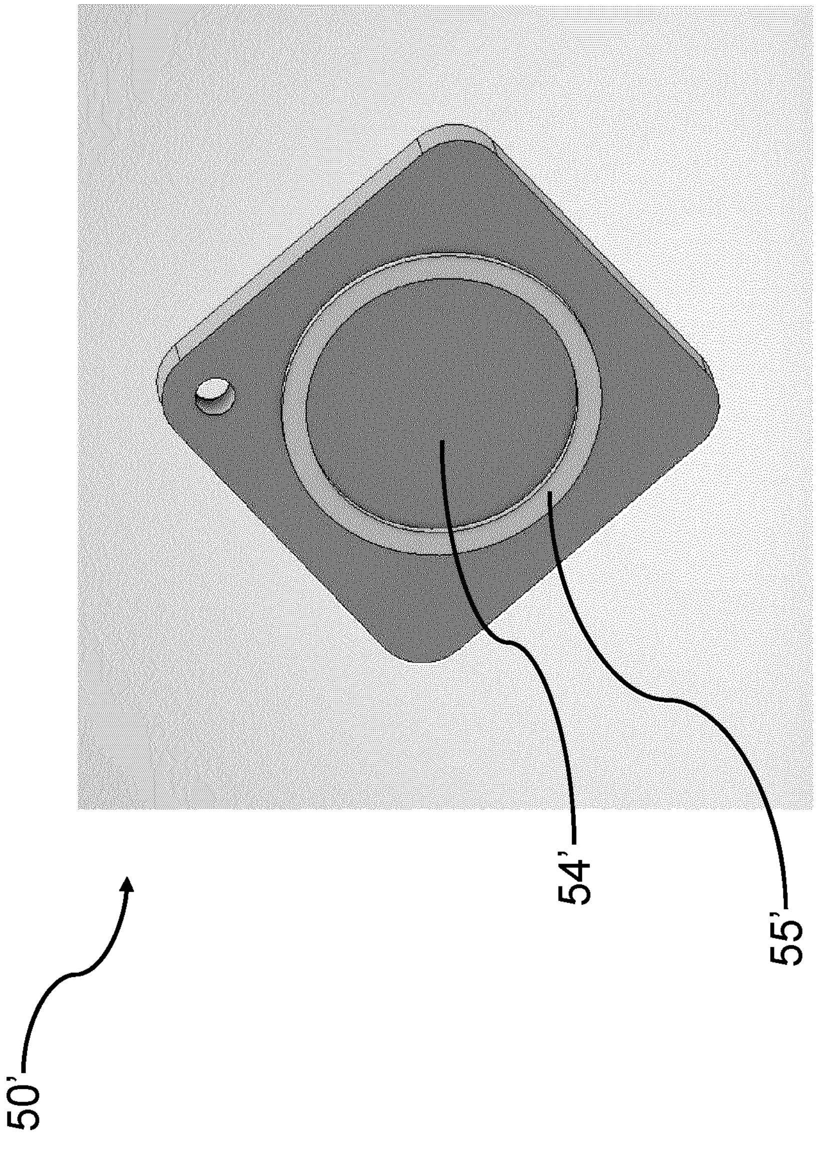
FIGS. 10A and 10B show perspective views of exemplary user devices for interacting with the summoning system of FIG. 9.

Referring to FIG. 10A, in an embodiment a user device 50' in the form of a pendant beacon is shown, for instance to be worn around the neck of the user. As such, the user will be able to easily access the user device 50', for instance in the case of a fall, and press a large central button 54'. The button 54' may be sized so that it is easily locatable by the user. In some cases, the button's 54' resistance is sufficient so that the user will not press it accidentally. In other cases, to prevent accidental summons, the user may be required to press the button 54' for a predetermined amount of time, for instance five seconds, to activate the summoning feature.

The battery and wireless transmitter (not shown) may be housed within the body of the user device 50'. In some cases, a ring 55' surrounding the button 54' may includes lights that illuminate to indicate a status of the user device 50'. For instance, different light colors and/or display sequences can indicate that the support device 1 has successfully received a summon signal, that the user device 50' is out of range of the support device 1, that the battery of the user device 50' is low, etc. Other statuses to display may be contemplated as well. A hole 56' in the body of the user device 50' allows the user device 50' to be attached to a necklace, carabineer or other type of retaining device.

Figure 10B:
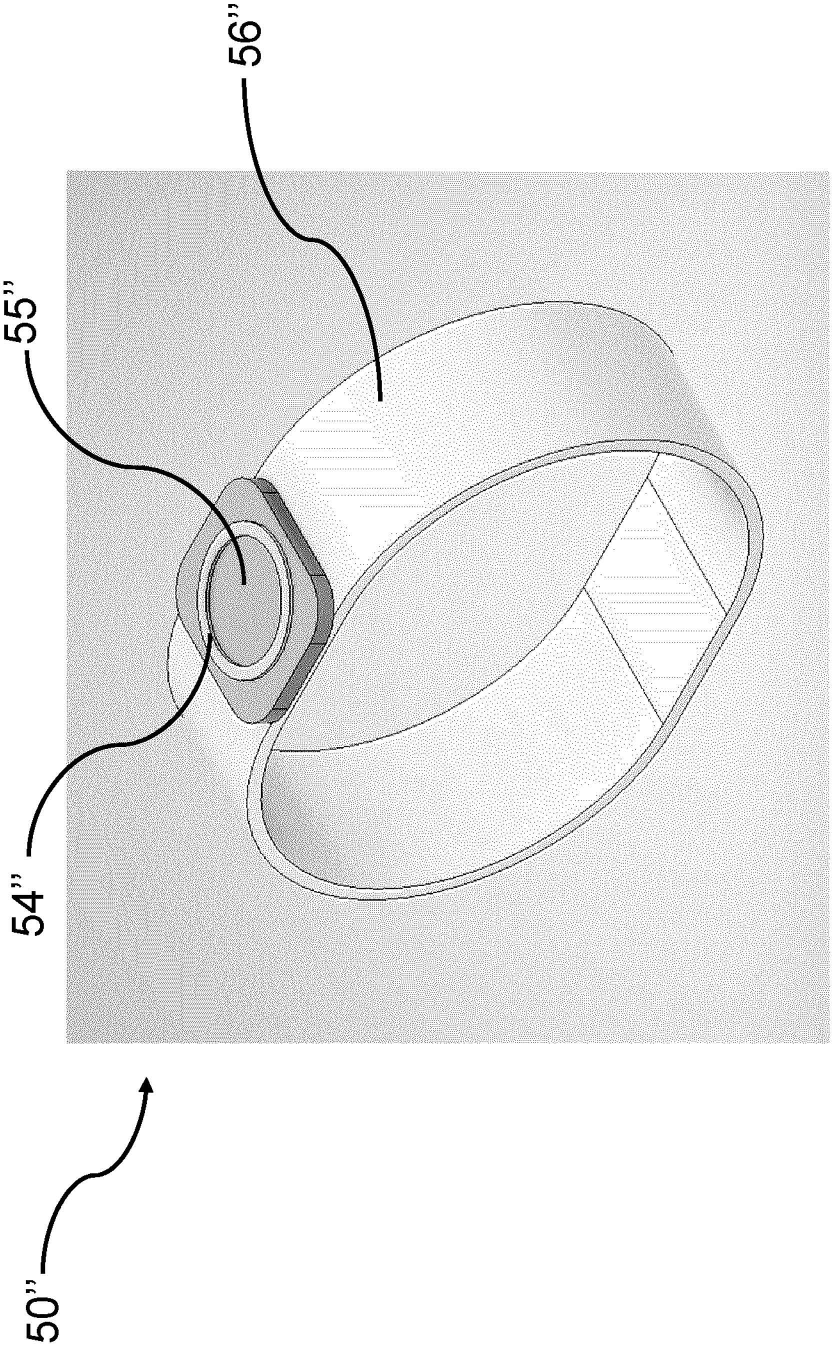

Referring to FIG. 10B, in another embodiment, a beacon-type user device 50" wearable on a user's arm is shown. A strap 56" may hold the user device 50" to the user's arm for easy access when needed. The strap 56" may be adjustable to conform to different sized wrists. In some cases, the strap 56" may be removable from the user device 50" and replaced with a different strap.

As discussed above, the nature of the wireless transmitter in the user device 50 may vary. In the case of FIGS. 10A and 10B, the wireless transmitters in user devices 50', 50" may be ultra high frequency (UHF) radio-frequency identification (RFID), although other wireless communication protocols may be considered such as Bluetooth Low Energy. Passive locating and summoning schemes may be contemplated as well, for instance in cases where the user device 50 does not include a battery 51 or other power source. Such schemes may include acoustic sensing, direct sensing, optical sensing or other radio frequency detecting means. For instance, the user device 50 may include a passive reflector including a diode and antenna, while the summoning system 40 may include a signal emitter for detecting and locating the user device 50. In such cases of passive location detection, the user would summon the support device 1 through alternate means, for instance via voice activation through a mobile application. In some cases, the real time location system may rely on multiple sources of user location data, for instance signals transmitted from the user's mobile or wearable device, the user device's 50 active wireless transmitter 52, and a passive signal to accurately triangulate the location of the user. Other sensing and locating means may be contemplated as well.

Referring to FIGS. 11-20, another embodiment of a support device 1" is shown. As will be discussed in further detail below, support device 1" may be configured for being folded or stowed when not in use in order to narrow its footprint, for example for storage or transportation. In the shown embodiment, the legs 2" are angled and connected to lower linking members 7". Together, each set of legs 2" and lower linking members 7" form a base of the device 1" and join the front wheels 6a" to the rear wheels 6b". In other embodiments, the base of the device 1" may be made from a single, molded frame. In the depicted embodiment, lower linking members 7" support front and rear vertical support members 4a" and 4b". Front and rear vertical support members 4a", 4b" may be referred to together as vertical support structures, with the device 1" thus having a pair of opposed vertical support structures extending from the base. As shown in the figures, each pair of front and rear vertical support members 4a" and 4b" are arranged in a triangular shape, with their lower ends relative to the vertical axis Y" spaced apart and their upper ends meeting. Other configurations may be contemplated as well. As will be discussed in further detail below, the front vertical support members 4a" may be configured to provide support to the device 1", while the rear vertical support members 4b" may be configured for housing various components relating to the lifting mechanism, as well as to provide support to the device 1".

Figure 14:
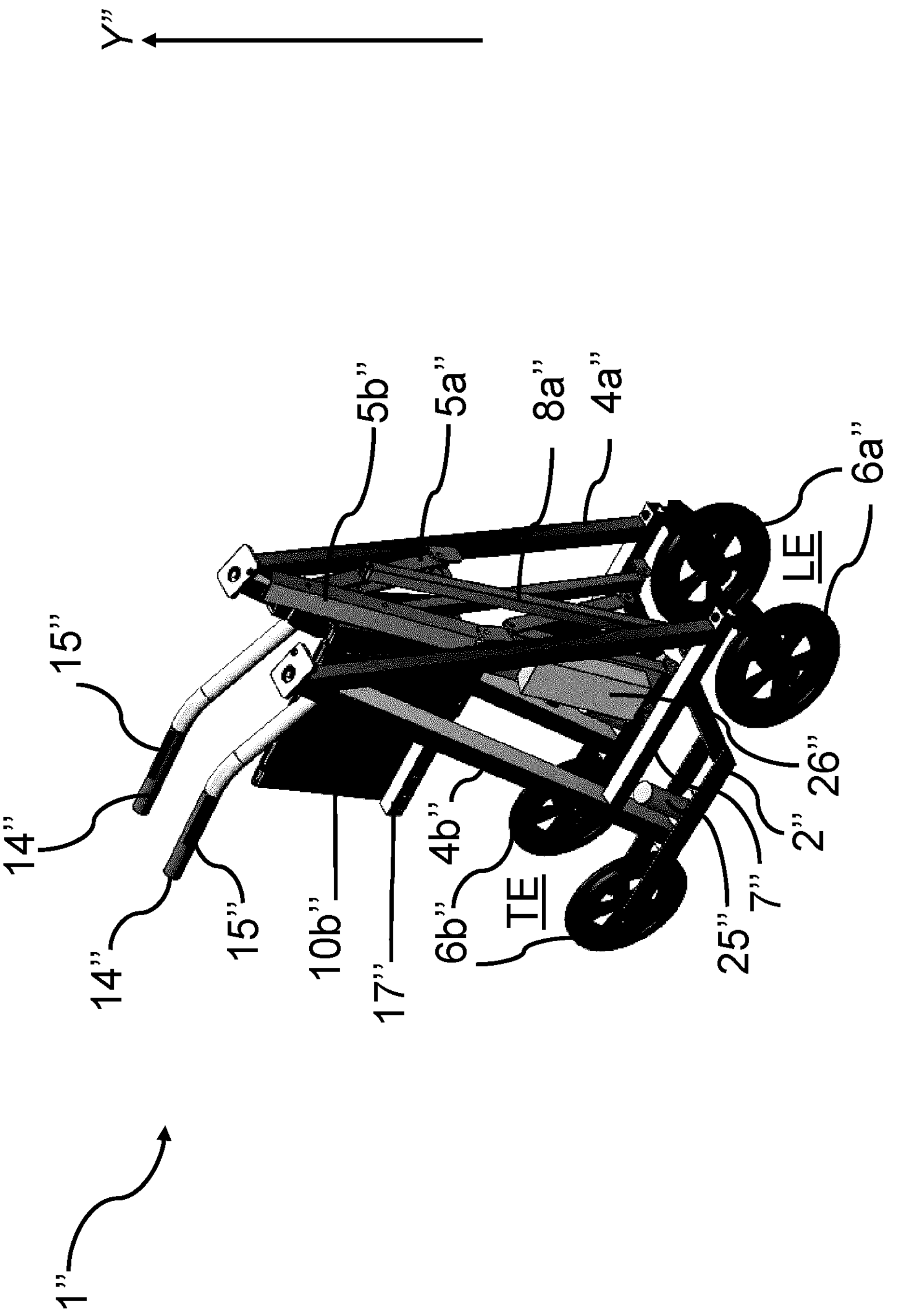
FIG. 14 is a rear perspective view of the support device of FIG. 11 in a folded or stowed configuration.
Figure 17:
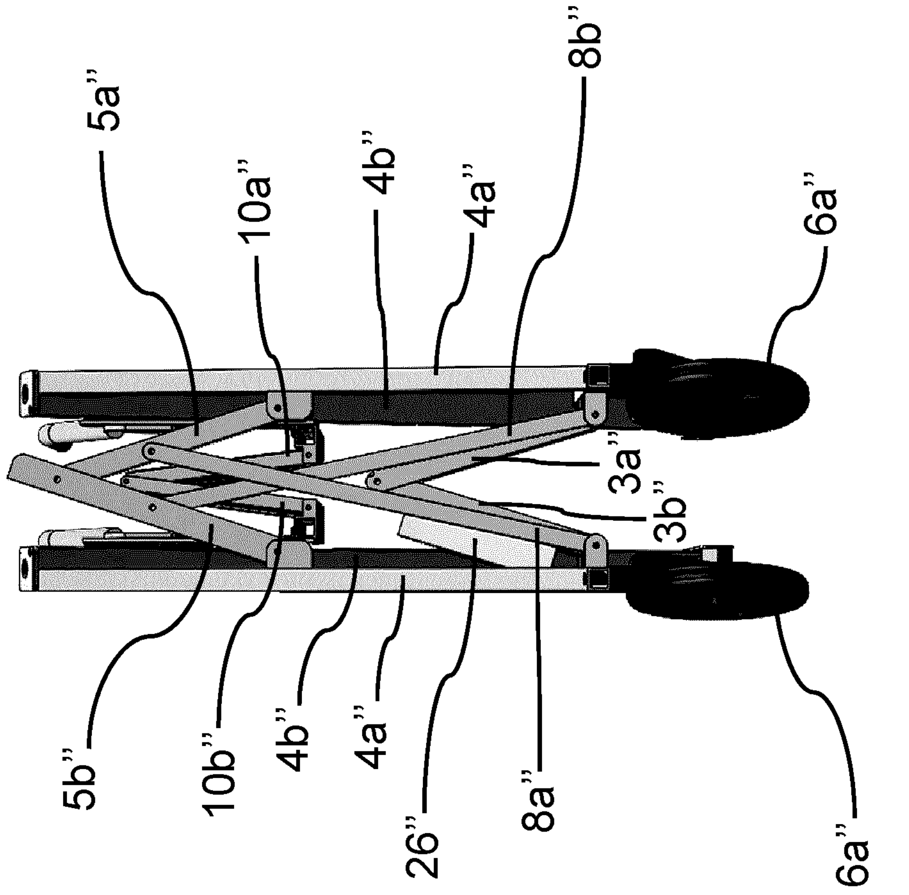
FIG. 17 is a front view of the support device of FIG. 11 in a folded or stowed configuration.
Figure 18:
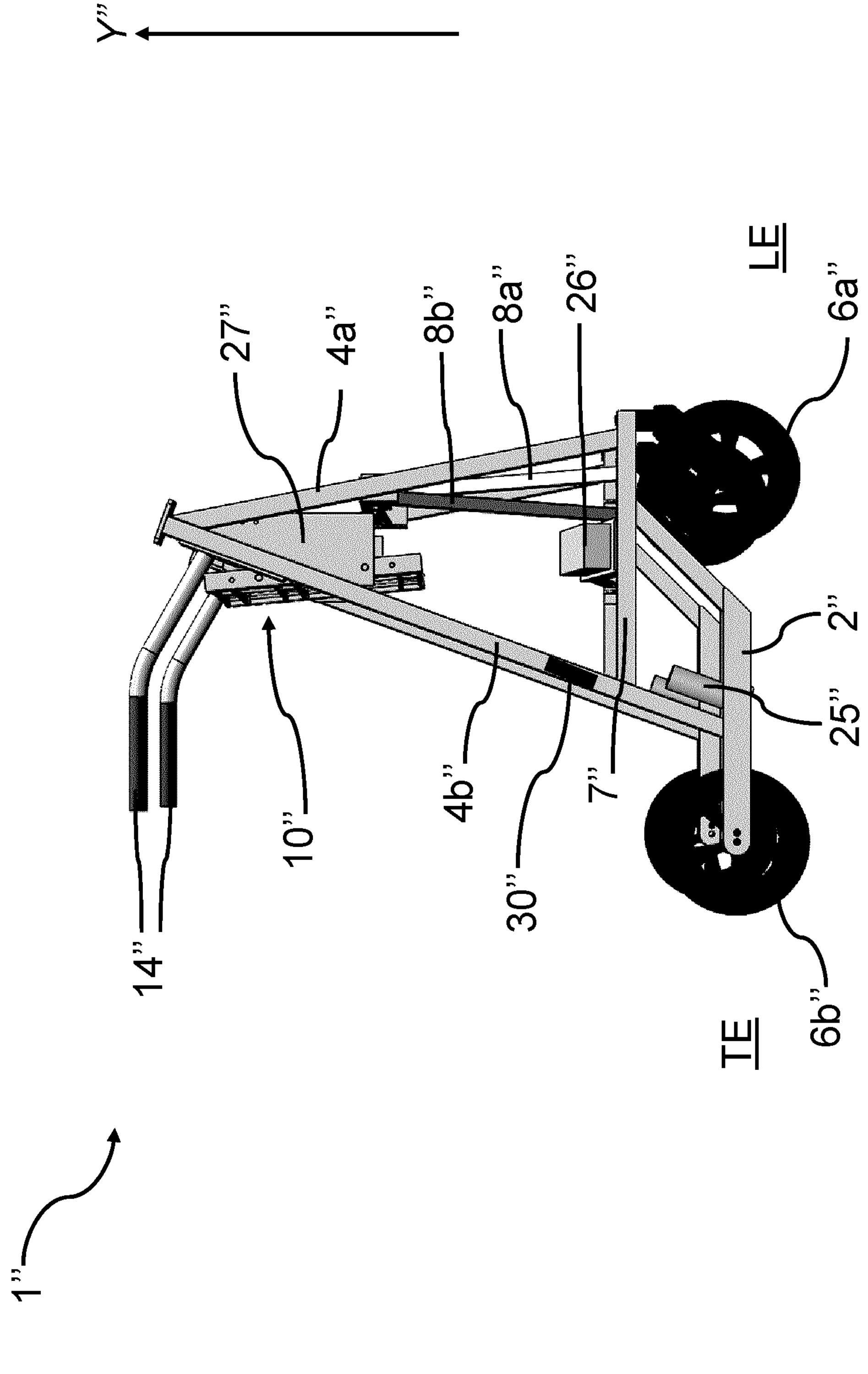
FIG. 18 is a side view of the support device of FIG. 11 in a fully raised position with the seat in a raised tilted position.
Figure 19:
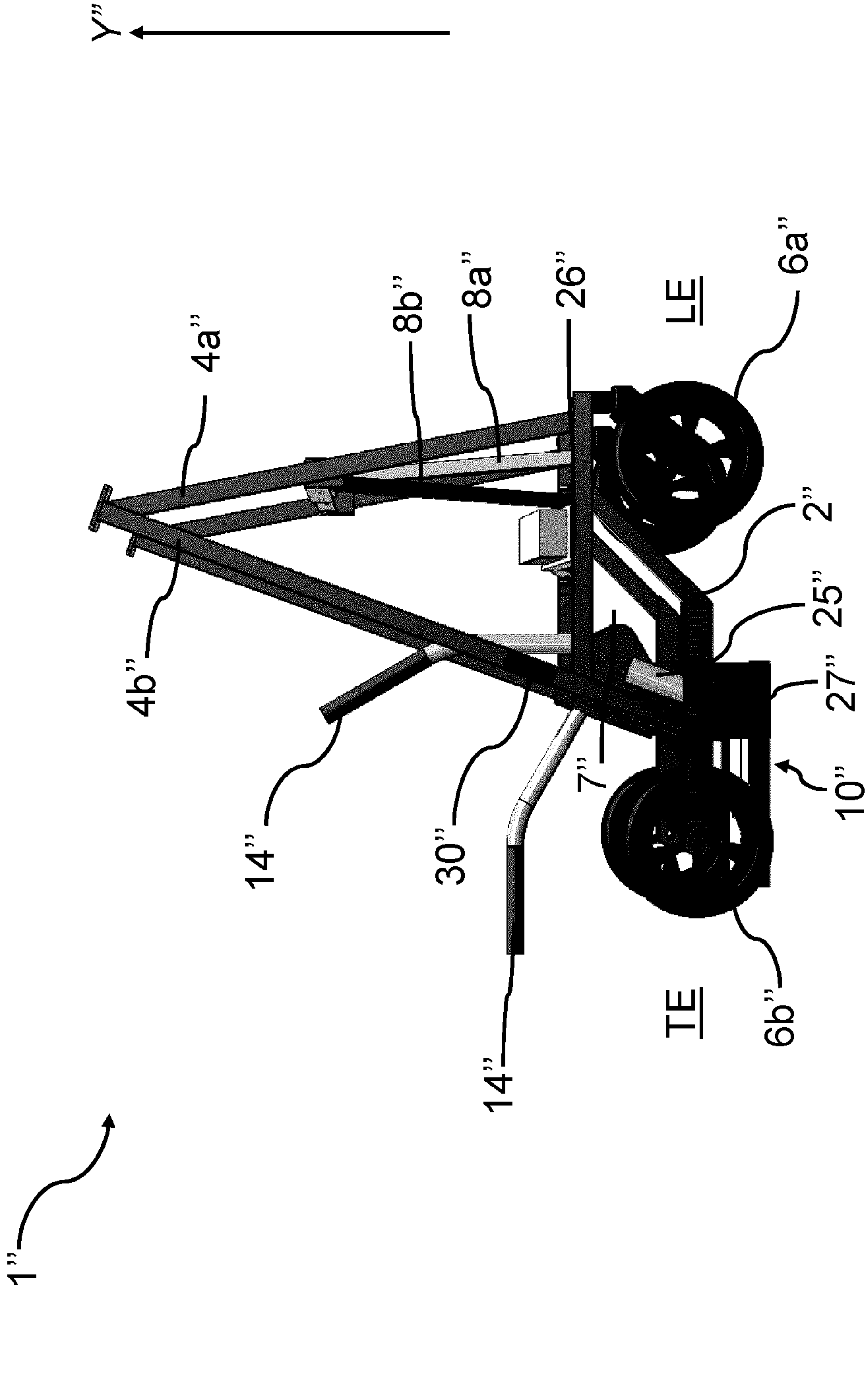
FIG. 19 is a side view of the support device of FIG. 11 in a fully lowered position with one arm in a raised tilted position.

A pair of lower horizontal support members 3a", 3b" illustratively extend transversely between lower linking members 7" and are hingedly connected towards a middle of the device 1". As such, first and second lower horizontal support members 3a", 3b" may be folded into one another when the device 1" changes into a folded or stowed configuration. Other connection types between first and second lower horizontal support members 3a", 3b" may be contemplated as well. Similarly, the upper horizontal support member is illustratively split into first and second upper horizontal support members 5a", 5b" that extend between front vertical support members 4a" and are hingedly connected towards the middle of the device 1" to allow the device 1" to change into its folded or stowed configuration. The lower horizontal support members 3a", 3b" and/or the upper horizontal support members 5a", 5b" may contribute to the alignment of the side frames and/or to rigidify the assembly, but may be optional. In the depicted embodiment, and as can be seen in FIGS. 14 and 17, the second upper horizontal support member 5b" overlap with a portion of the first upper horizontal support member 5a" in the device's 1" open configuration, with the hinged connection spaced inwardly from the end of the second upper horizontal support member 5b". Other arrangements may be contemplated as well, for instance the hinged connection being at the ends of each of the first and second upper horizontal support members 5a", 5b". The height of the first and second upper horizontal support members 5a", 5b" along the front vertical support members 4a" may vary, for instance to correspond with a maximum displaceable height of the seat 10".

The depicted device 1" further includes front and rear diagonal support members 8a", 8b", each extending from one of the lower linking members 7" to a respective one of the first or second upper horizontal support members 5a", 5b". Illustratively, the front and rear diagonal support members 8a", 8b" are rotatably connected to respective lower linking members 7", allowing them to follow the articulating first and second upper horizontal support members 5a", 5b" as the device 1" changes into its folded or stowed configuration. The legs 2", lower horizontal support members 3a", 3b", lower linking members 7", vertical support members 4a", 4b", horizontal support members 5a", 5b", and diagonal support members 8a", 8b" may be referred to as the frame of the support device 1'. Other arrangements for the frame may be contemplated as well. The front and rear diagonal support members 8a". 8b" are bracing or like X-type structure working against a deformation of the depicted device 1" when in its open configuration.

In the depicted embodiment, the seat 10" includes first and second portions or sections 10a", 10b" hingedly connected at first ends towards the middle of the device 1" (i.e. at a centerline of the seat 10"), for instance via pins, and mounted on rails 17" at their other ends via hanger plates 27" to sliding blocks 28" at respective rear vertical support members 4b". The hanger plates 27" or equivalents are configured for transferring the load applied to the seat 10" to the sliding blocks 28" and to frame of the device 1". Each sliding block 28" is configured for sliding within an angled channel within a respective rear vertical support member 4b", allowing the seat 10" to displace in a vertical direction relative to the Y" axis. Other displacement means may be contemplated, for instance a rail and guide system or a shaft and collar system.

Figure 11:
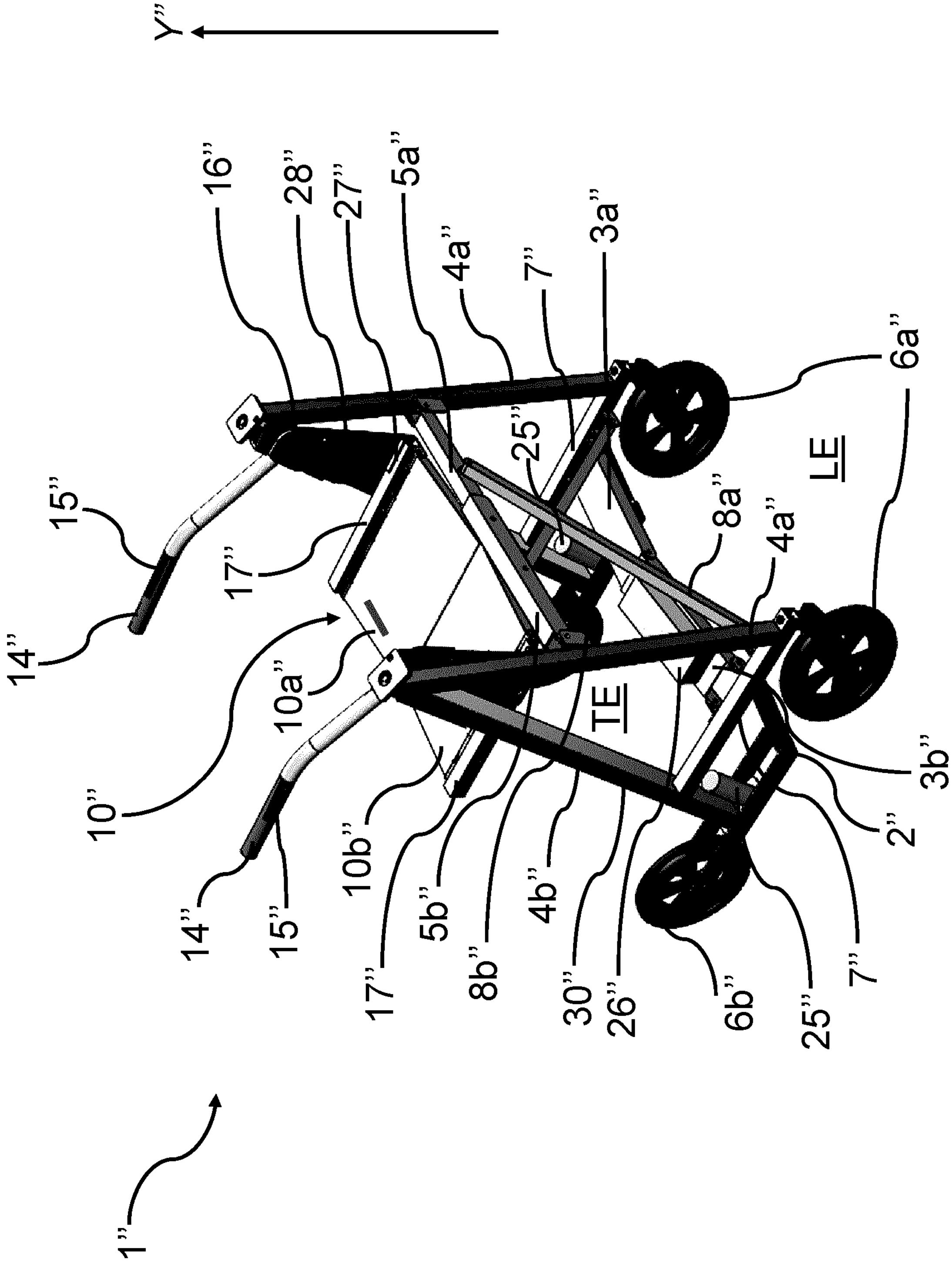
FIG. 11 is a rear perspective view of a support device in a fully raised position according to another embodiment of the present disclosure.
Figure 12:
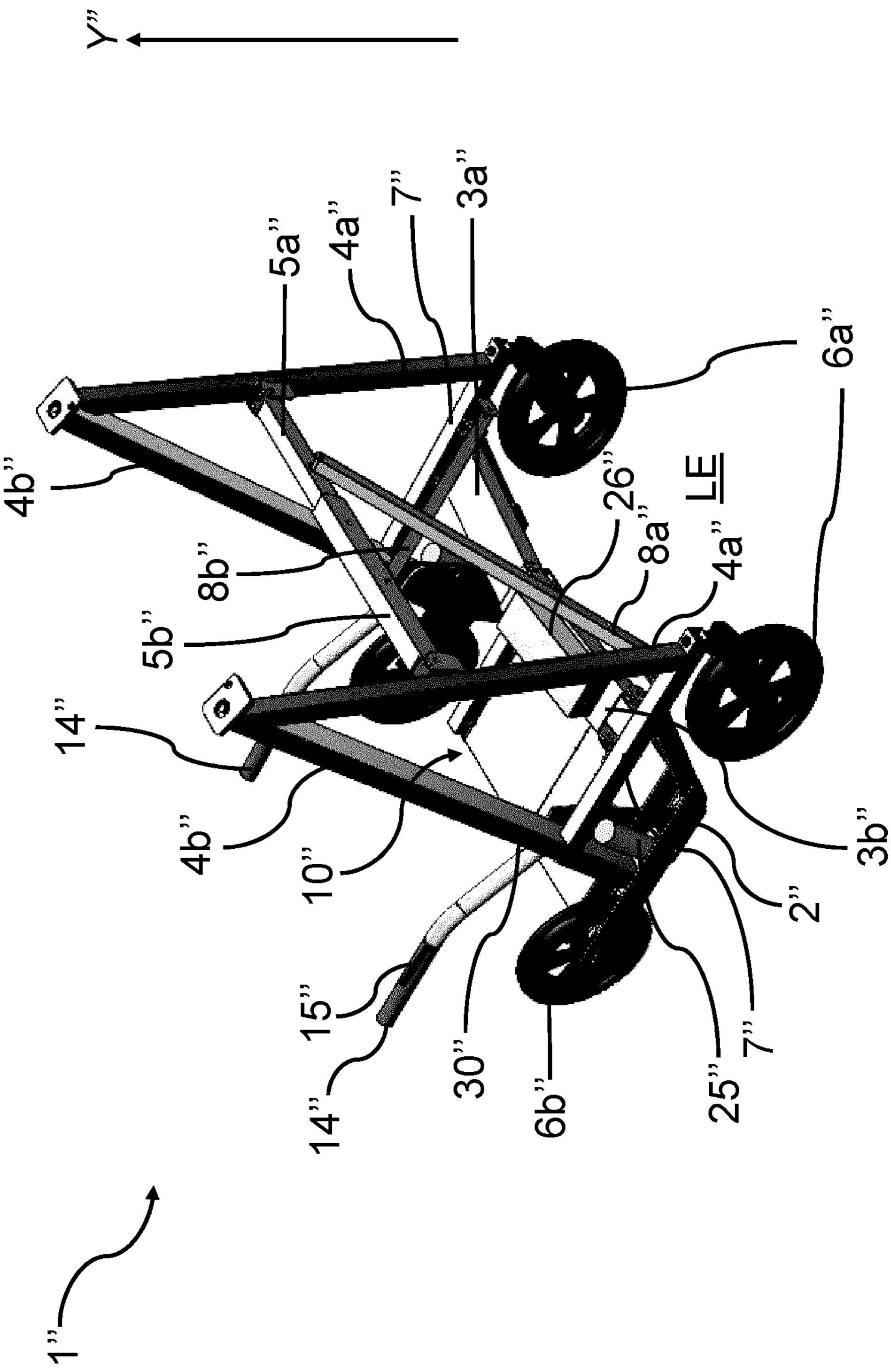
FIG. 12 is a rear perspective view of the support device of FIG. 11 in a fully lowered position.
Figure 13:
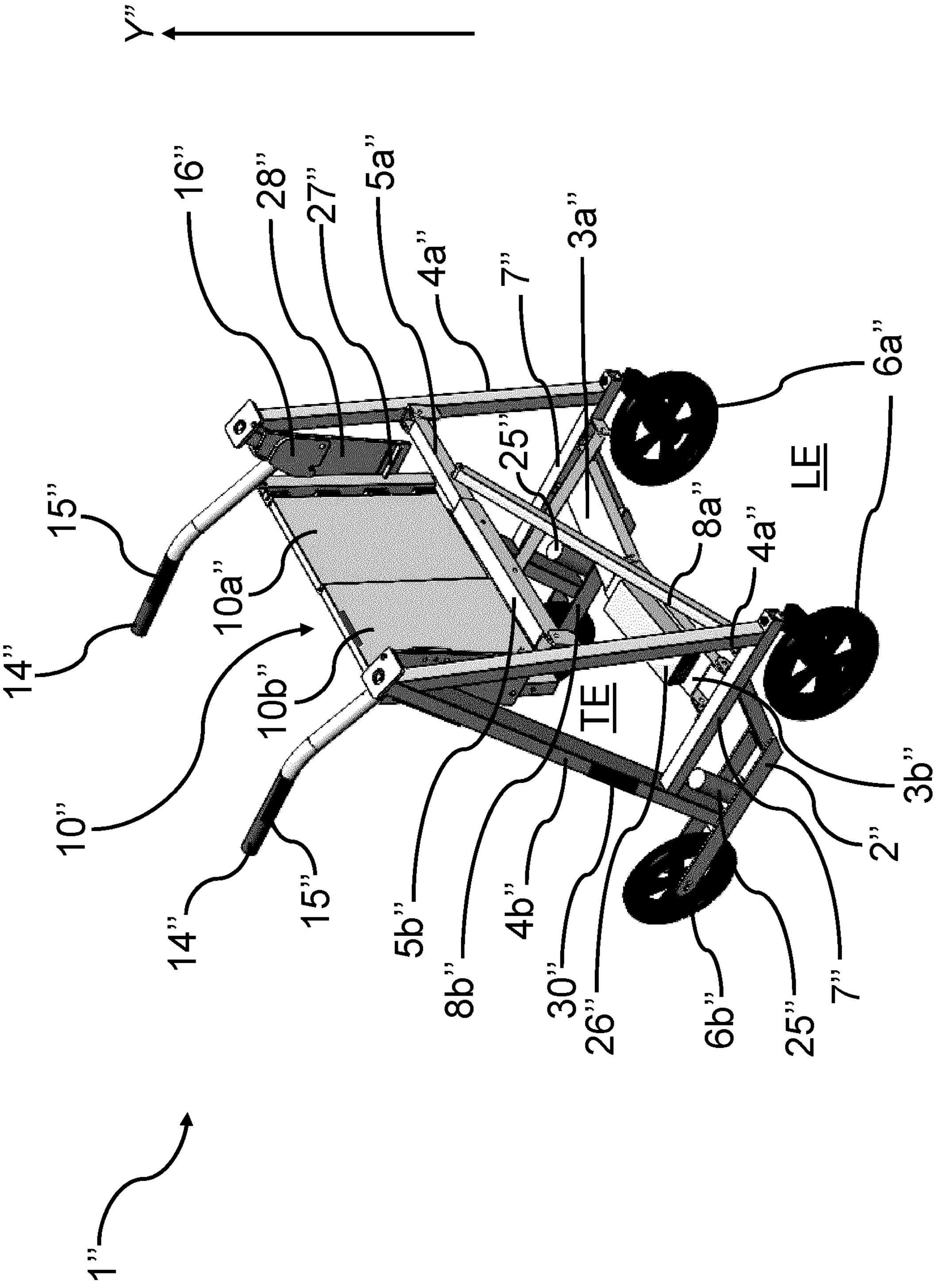
FIG. 13 is a rear perspective view of the support device of FIG. 11 in a fully raised position with the seat in a raised tilted position.
Figure 15:
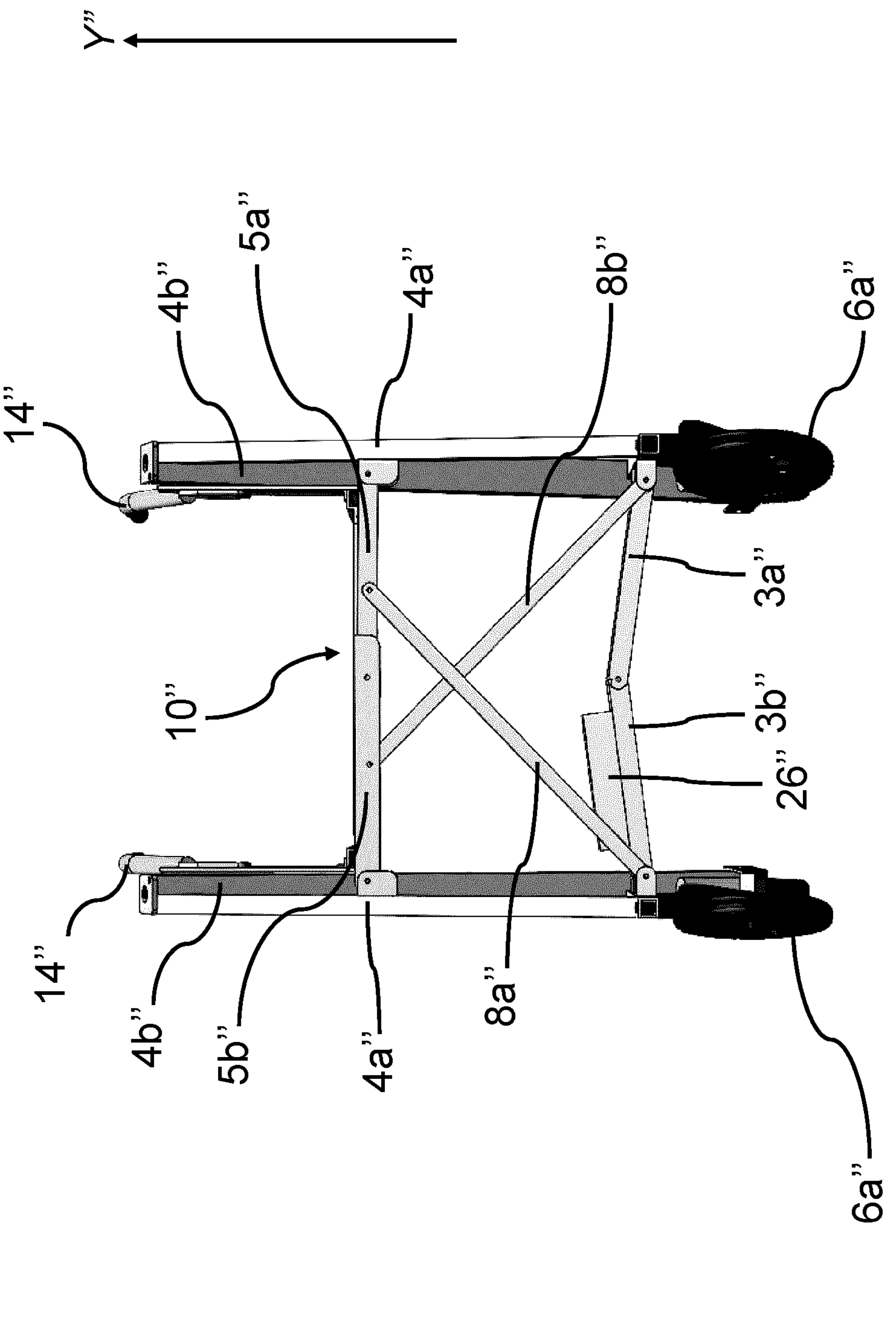
FIG. 15 is a front view of the support device of FIG. 11 is a fully raised position.
Figure 16:
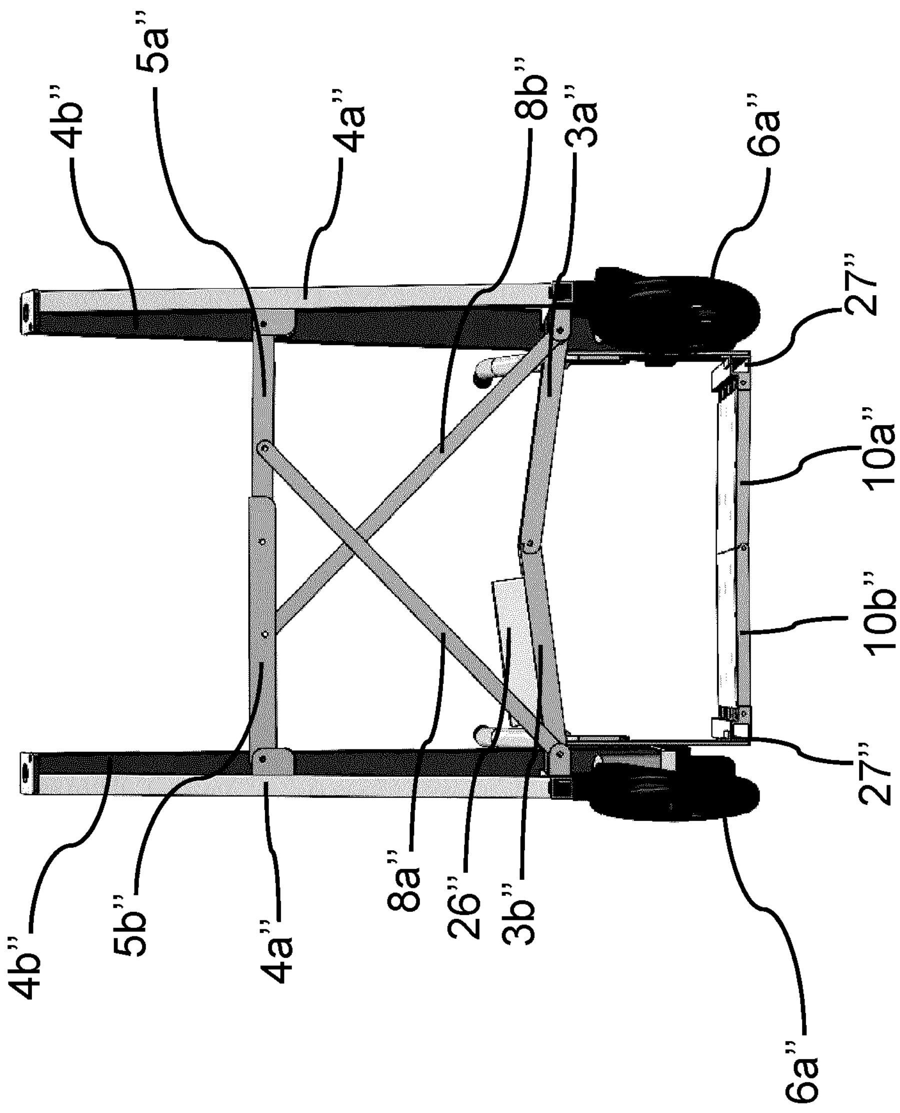
FIG. 16 is a front view of the support device of FIG. 11 in a fully lowered position.
Figure 20:
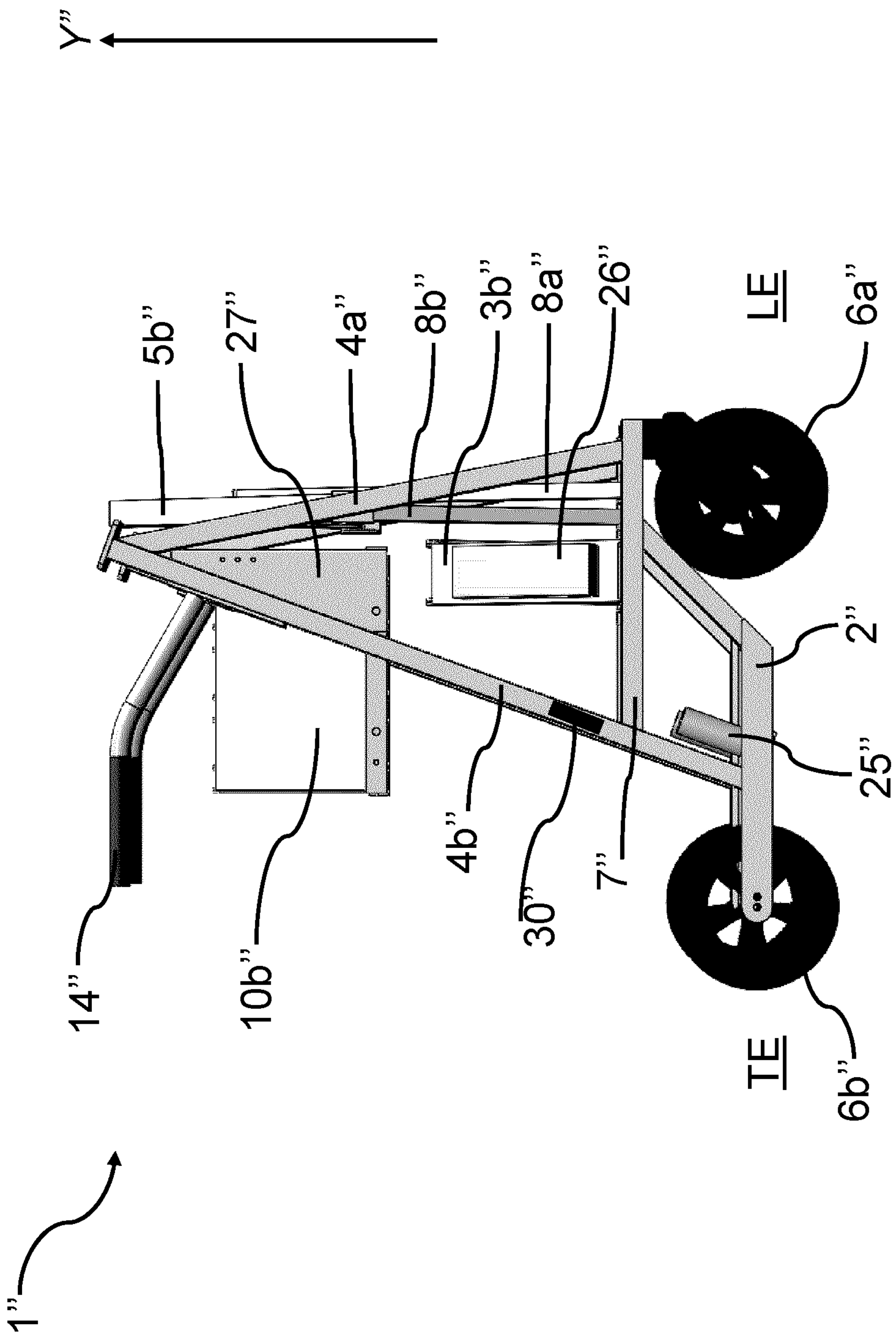
FIG. 20 is a side view of the support device of FIG. 11 in a folded or stowed configuration.

The first and second portions 10a", 10b" of the seat are configured for hinging at their connection point and folding inwards (i.e. towards one another at their hinged connection) as the device 1" changes into its folded or stowed configuration, as depicted in FIGS. 14, 17 and 20. In an open or non-folded configuration, as depicted in FIGS. 11 and 15, the first and second portions 10a", 10b" are shown to be parallel or coplanar. In addition, as shown in FIG. 13, the seat 10" may be partially releasably connected to the hanger plates 27" so that it may be rotated or tilted into an upright configuration, for instance to allow the device 1" to be used as a rollator walker. For instance, in some cases the seat 10" can fold or tilt up to ninety degrees upward relative to the ground (i.e. relative to the base structure formed by the lower linking members 7" and the legs 2"), providing sufficient room for a user's gait within the frame. In a non-folded configuration, the seat 10" may be substantially horizontal with the ground. When the device 1" is being used as a walking mobility aid, it may be used with the seat 10" in either a horizontal or vertical position, for instance based on the user's preferences and physical limitations. Other seat types may be contemplated, such as a hammock-type seat, a rigid seat platform that folds downward from one side of the device 1", a completely removable seat, a telescoping seat, a collapsing, puzzle piece-like seat, or a fabric or like non-rigid seat held taut in the open configuration. The arms 14" may be tiltable as well, for instance being received in slots or channels 16" mounted to the sliding blocks 28". As such, the arms 14" may displace vertically with the seat 10". In addition, the relative height between the arms 14" and the seat 10" may be adjusted as well.

In the depicted embodiment, the lifting mechanism is configured for vertically displacing the seat 10" between a lowered position (see, for instance, FIGS. 12 and 16) and a raised or seating position (see, for instance FIGS. 11 and 15) and includes a pair of motors 25", each positioned on a corresponding leg 2" adjacent a rear diagonal member 8*b*", and a battery 26" positioned on one of the lower horizontal support members, illustratively the second lower horizontal support member 3*b*". Other positions for the motors 25" and battery 26" may be contemplated as well. For instance, in some cases one or more motors 25" may be positioned underneath the seat 10". Other numbers of motors and batteries may be contemplated as well. A pair of lead screws (not shown) extend through respective rear vertical support members 4*b*" and are operatively connected to the motors 25" to drive the seat 10". The lead screws are thus operatively connected to the sliding blocks 28" to convert rotary motion from the motors 25", each powered by the battery 26", into translational motion of the seat 10" substantially along the Y" axis. For instance, the upper ends of the sliding blocks 28" may contain a threaded nut (not shown) configured for traveling along respective lead screws, with the weight transferred from the seat 10" maintaining an axial load on the lead screws. Other mounting arrangements may be contemplated as well.

In various embodiments, the motors 25" may be DC motors, although other motor types may be contemplated as well. The battery 26" may be a rechargeable a lithium-ion based battery, although other batteries such as nickel-based batteries or nano-diamond-based batteries may be contemplated as well. In some cases, the battery 26" may be removable or non-removable. Rotary motion may be transferred from the motors 25" to the lead screws by spur gears in order to displace the seat 10" upward and downward. Other arrangements may be contemplated as well, for instance a timing belt with pulleys. Such pulleys may be positioned at the drive shafts of the motors 25" and then rotated by a connected timing belt to transfer power from the motor to the lead screws. Direct drive means may be contemplated as well.

While the depicted device 1" utilizes a DC motor and lead screws for vertically displacing the seat 10", other drive means may be contemplated. For instance, in various embodiments, a drive system for the seat 10" may include pneumatic linear actuators, hydraulic linear actuators, scissor lifts with actuators or lead screws, a winch system, and/or single or multiple rack and pinions. Other drive means may be contemplated as well.

Referring to FIGS. 14, 17 and 20, the device 1" may be changed or converted into a folded or stowed configuration by contracting or approaching the two sides of the frame towards each other. Illustratively, the first and second upper horizontal support members 5*a*", 5*b*" include an overlapping pinned or hinged link, creating a straight horizontal support member in a fully open or expanded configuration. As discussed above, the diagonal support members 8*a*", 8*b*" connect to respective upper horizontal support members 5*a*", 5*b*" and lower linking members 7" to create a scissor link operable to expand in the device's expanded configuration and contract in the device's folded or stowed configuration. The seat sections 10*a*", 10*b*" and lower horizontal support members 5*a*", 5*b*" are similarly operable to expand and contract. The device 1" may be provided with one or more handles, straps, pull tabs or other like components that, when pulled or otherwise activated, cause the device 1" to fold inward. Such handles or other like components may be positioned on the seat 10", the upper horizontal support members 5*a*", 5*b*", or at other suitable locations. In some embodiments, the device 1" may be configured for automatically changing from its expanded and folded configurations. For instance, additional motors (not shown) may be provided and be configured for extending and/or contracting the various linking members of the device 1". Such changing may be controlled, for instance, by a user via the control panel 30". In other cases, such changing may be automatically engaged via the above-described summoning system 40 based on the location of the device 1".

The device 1" includes a braking system operable to arrest a device 1" in motion or maintain a device 1" at rest. The braking system includes a braking input, means for communicating said input to the wheels 6", and friction means for slowing, stopping or preventing rotation of the wheels 6". The input may be one or more brake levers 15" positioned on the arms 14", as discussed above. Other braking means may be contemplated, such as switch, a dial, a button, or a joystick. The device 1" may further include a parking brake. In some cases, the parking brake may be engaged via the same brake levers 15" used to control the device's main brakes, for instance by engaging them in an opposite direction as to engage the main brakes. The input from the brake lever(s) 15" (or other input means) may travel from the arms 14" or other suitable location to the wheels 6" through various means. For instance, a rotating rod (not shown) fixed on an axis can transfer input from the brake lever(s) 15" to the wheels 6". Some or all of the wheels may be connected to the input means. The displacement of the seat 10" upon actuation of the lifting mechanism may affect the default braking mode. For instance, a seat 10" in motion, i.e., being raised or lowered by the lifting mechanism, may cause the brakes to engage, with a positive action required to disengage the brakes once the seat 10" is no longer in motion. Other input transfer means may be contemplated, such as a cable braking mechanism, a telescoping rod system, a ratcheting cable system, electric wired or wireless braking system, hydraulic braking system. To slow or prevent movement of the wheels 6", the device 1" may include any suitable mechanism that applies pressure on one or more wheels 6" to resist rotation. For instance, a levered arm with a brake pad mounted thereon may apply the brake pad to a face of the wheel 6" when pulled in a direction by the input means, applying friction and resisting rotation. In other cases, the device 1" may include a disc braking system. In other cases, brake pads may be used to apply pressure to the sides of the wheel(s) 6". Other braking systems may be contemplated as well, for instance ones positioned on the hub of the wheel(s) 6". Means for adjusting the required tension to be applied to the brake lever(s) 15" may be provided as well. In addition, supplementary brakes may be provided on one or more of the wheels 6", for instance to apply a constant braking force to prevent the device 1" from accelerating too quickly.

In the depicted embodiment, the front and rear wheels 6*a*", 6*b*" are shown to be caster-type wheels of the same width and diameter. Other arrangements may be contemplated as well, for instance the front or rear wheels being smaller or larger diameter. As shown, the front wheels 6*a*" are rotatable while the rear wheels 6*b*" are fixed in a direction that is aligned with the legs 2". In other embodiments, each of the wheels may be partially or fully rotatable. Other wheel types may be contemplated, for instance omni-directional and individually-controllable mecanum-like wheels.

Figure 21:
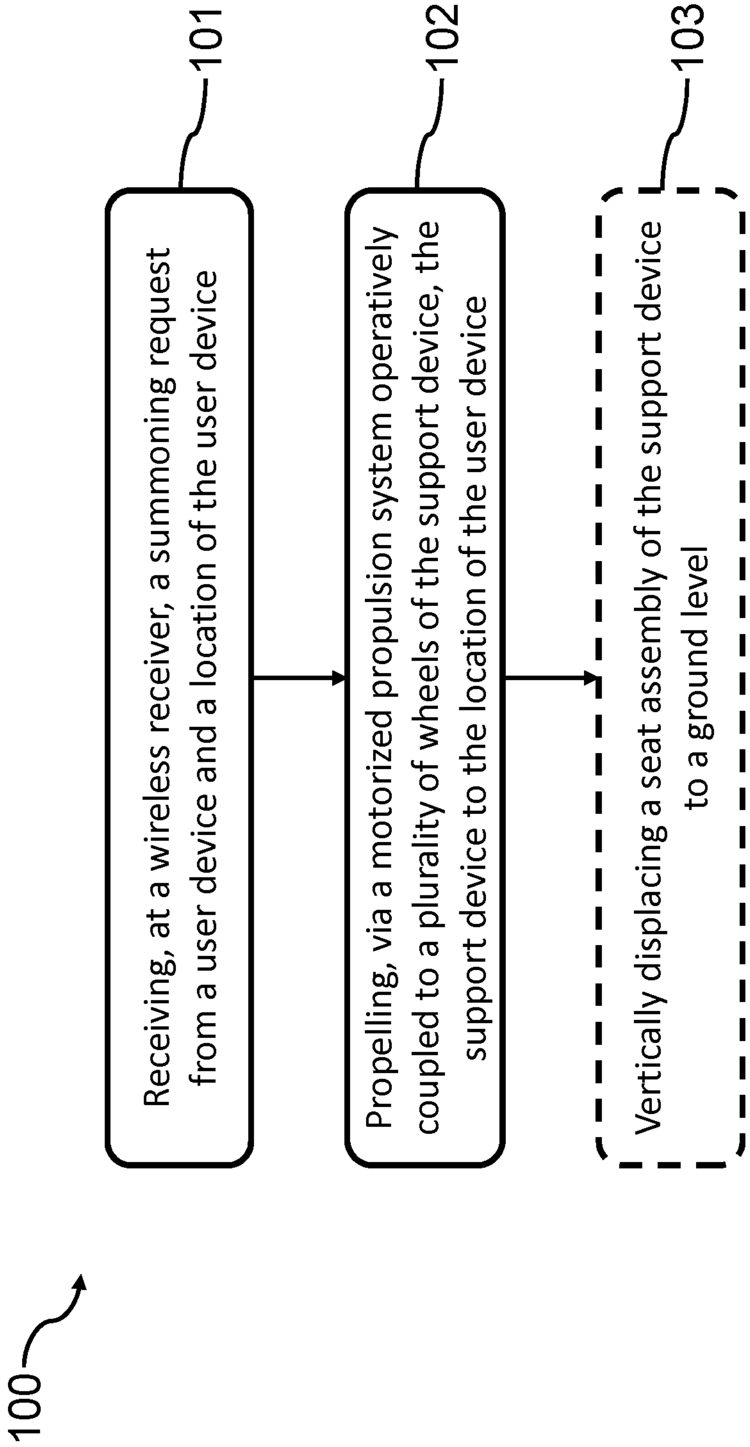
FIG. 21 is a flow chart for an exemplary method for operating a support device.

Referring to FIG. 21, there is shown an flow chart for an exemplary method for operating a support device, for instance support device 1, 1' or 1".

At step 101, a summoning request and a location of a user device is received at a wireless receiver of the support device. For instance, the wireless receiver may be wireless receiver 43 of summoning system 40, and user device may be user device 50, 50' or 50" emitting a signal from wireless transmitter 52.

At step 102, the support device is propelled, via a motorized propulsion system operatively coupled to a plurality of wheels of the support device, to the location of the user device. For instance, the motorized propulsion system may include the various batteries and motors operatively coupled to the wheels 6, 6', 6" discussed above. In some embodiments, step 102 may further include detecting one or more obstacles via one or more sensors, and navigating the support device to avoid the one or more sensors. Such sensors may be sensors 45, and data collected by the sensors may be stored in a real time location system.

At optional step 103, a seat assembly of the support device is vertically displaced to a ground level, i.e. where a user intending to use the device may be situated, subsequently to the propelling at step 102. For instance, the seat assembly may be seat 10, 10', 10", and optional step 103 may be triggered by an additional command received along with the summoning request.

In some embodiments, the method 100 may further include receiving a signal from the user device that a user has sustained an injury, and proceeding with the propelling at step 102 despite not receiving the summoning request at step 101. For instance, the user device may include an accelerometer that may detect when a user has fallen and may require assistance to regain an upright position.

Figure 22A:
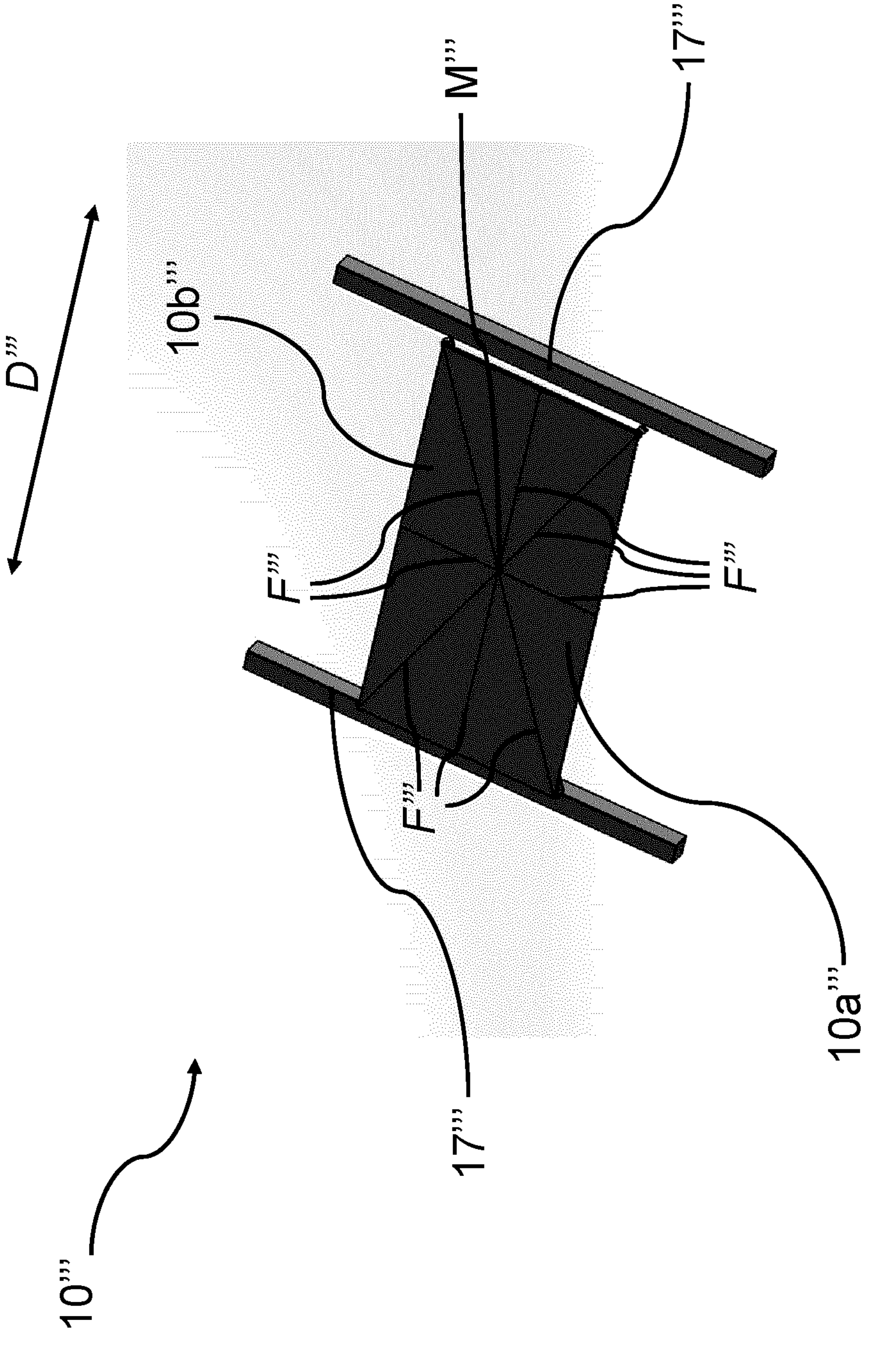
FIGS. 22A-22C are perspective views of a seat assembly for a support device in accordance with another embodiment of the present disclosure.
Figure 22B:
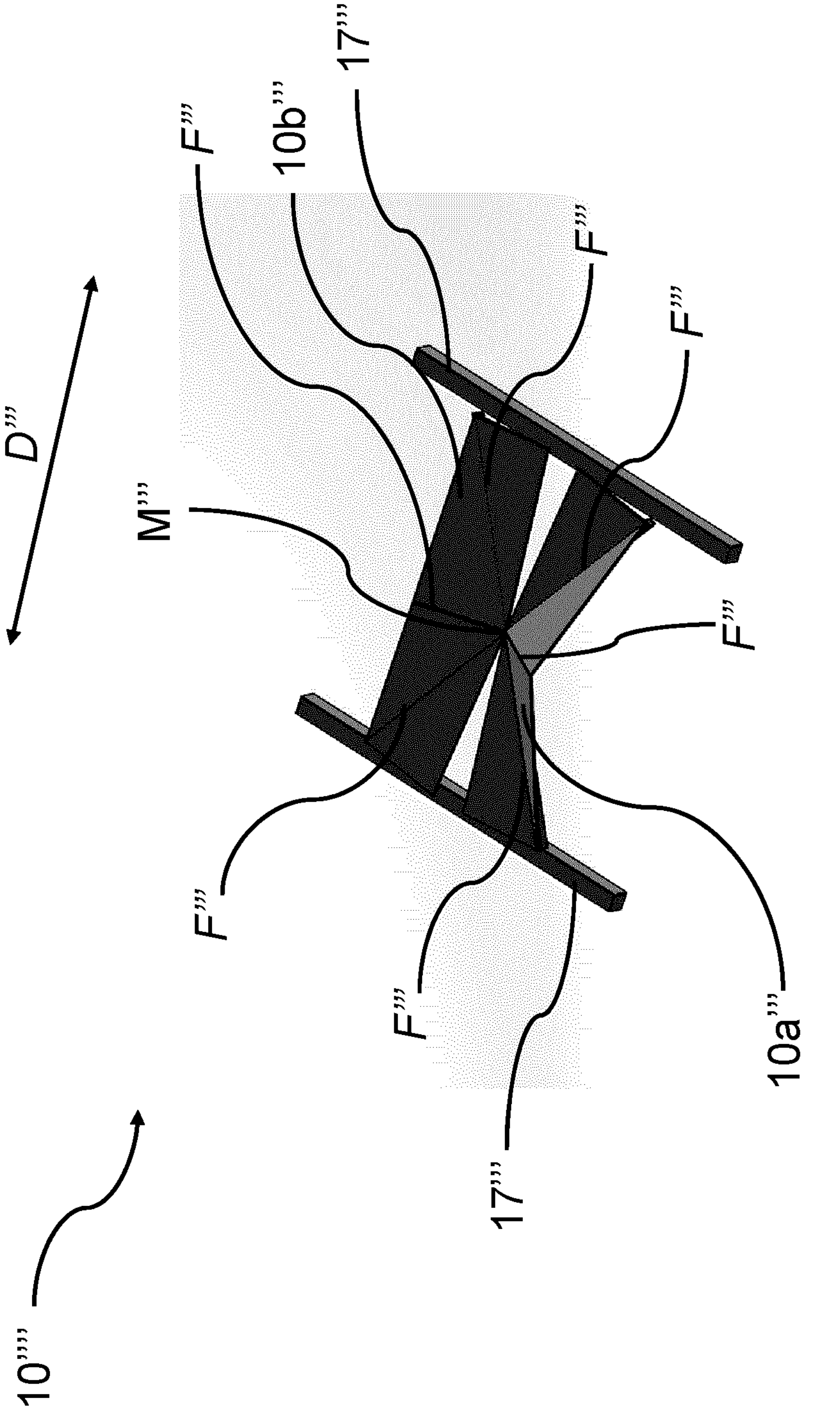
Figure 22C:
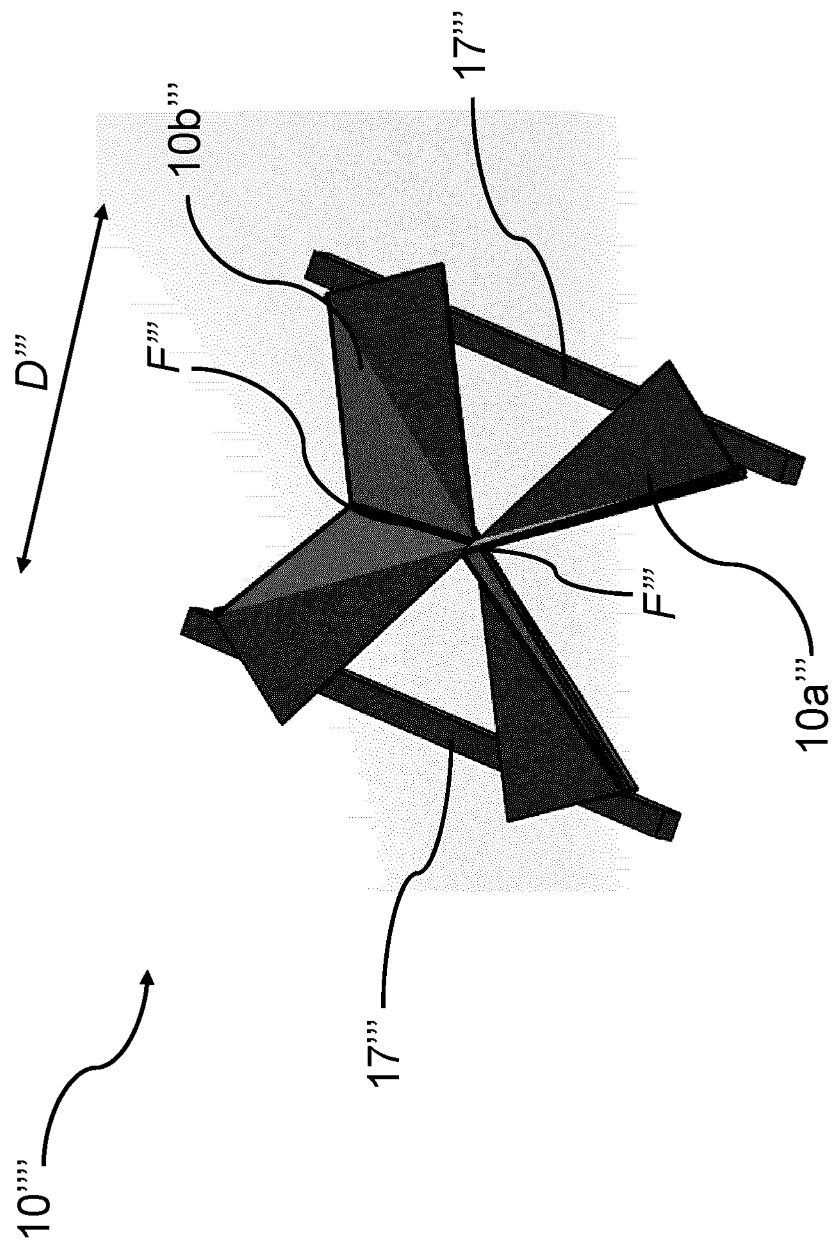

Referring to FIGS. 22A-22C, another embodiment for a seat assembly 10'" is shown. In a similar fashion to seat assembly 10" shown in FIGS. 11-20, seat assembly 10'" includes first and second seat portions **10*a*'", 10*b*'", illustratively supported by rails 17'" configured to connect the seat assembly 10" to the frame of a support device such as support device 10". FIG. 22A shows the seat assembly 10" in a fully expanded or open configuration, with the first and second seat portions 10*a*'", 10*b*'" substantially flush with one another with their upper surfaces parallel. As shown in FIG. 22B, which depicts the seat assembly 10" in a partially contracted or folded configuration, as the two rails 17" begin to approach one another, the seat assembly 10" begins to fold in an origami-like fashion. To enable such as fold, the first and second seat portions 10*a*'", 10*b*'" are aligned such that their connecting edges are perpendicular to a direction D'" of the seat's expansion/contraction, with the two portions 10*a*'", 10*b*'" hingedly connected at a common midpoint M'". Each seat portion 10*a*'", 10*b*'" includes additional folding lines F'", allowing each seat portion 10*a*'", 10*b*'" to fold into itself. Each seat portion 10*a*'", 10*b*'" is shown to include three fold lines F'", although other numbers may be contemplated as well. FIG. 22C shows the seat assembly 10'" in a fully contracted or folded configuration. Due to the various fold likes F'", each seat portion 10*a*'", 10*b*" changes from a rectangular-shaped, flat seat platform as per FIG. 22A to the folded shapes depicted in FIG. 22C, allowing the seat assembly 10'"** to occupy a narrower space.

When applicable, the various characteristics, options and alternatives of the devices 1, 1' and 1" may be interchanged, with like reference numerals referring to like elements. Likewise, the summoning system 40 and corresponding user devices 50, 50', 50" may be used with the various devices 1, 1', 1" with the necessary adaptations.

As can be seen therefore, the examples described above and illustrated are intended to be exemplary only. The scope is indicated by the appended claims.

What is claimed is:

1. A support device comprising:

a frame including a base and an upright support including two opposed vertical support structures;

a seat assembly including a seating surface and connecting means for operatively connecting the seating surface to the frame; and a lifting mechanism for vertically displacing the seat assembly between a lowered position and a seating position the lifting mechanism including a battery, two electric motors receiving power from the battery, and two lead screws operatively coupled to the seat assembly, each of the two electric motors rotatably engaged to a respective one of the two lead screws, each of the two lead screws positioned within a respective one of the two vertical support structures and operatively connected to an end of the seat assembly.

2. The support device as defined in claim 1, wherein each of the opposed vertical support structures includes a front vertical support member and a rear vertical support member forming a triangular vertical support structure.

3. The support device as defined in claim 1, wherein the seat assembly includes a first seating surface hingedly connected to a second seating surface.

4. The support device as defined in claim 3, wherein the support device is movable between an open configuration whereby the first seating surface and the second seating surface are coplanar and a folded configuration whereby the two opposed vertical support structures are approached towards each other and the first seating surface and the second seating surface are folded towards one another.

5. The support device as defined in claim 3, wherein each of the first seating surface and the second seating surface is mounted to a respective vertical support structure via a hanger plate and a sliding block slideable through an angled channel in the respective vertical support structure.

6. The support device as defined in claim 1, further comprising one or more wheels operatively coupled to the base.

7. The support device as defined in claim 6, further comprising a braking system for selectively preventing at least one of the one or more wheels from rotating.

8. The support device as defined in claim 6, further comprising at least one additional electric motor for powering at least one or more of the one or more wheels.

9. The support device as defined in claim 1, wherein the seating surface is tiltable between a horizontal position and a vertical position relative to the base.

10. The support device as defined in claim 1, further comprising two arms surrounding the seating assembly.

11. The support device as defined in claim 9, wherein the arms are tiltable between a horizontal position and a vertical position relative to the base.

12. The support device as defined in claim 1, further comprising a control panel for controlling at least the lifting mechanism.

13. The support device as defined in claim 11, wherein the control panel is removably positioned on the upright support.

14. A support device comprising:

a frame including a base and an upright support including two opposed vertical support structures, each of the opposed vertical support structures including a front vertical support member and a rear vertical support member forming a triangular vertical support structure;

a seat assembly including a seating surface and connecting means for operatively connecting the seating surface to the frame; and a lifting mechanism for vertically displacing the seat assembly between a lowered position and a seating position, the lifting mechanism including a battery, two electric motors receiving power from the battery, and two lead screws operatively coupled to the seat assembly, each of the two electric motors rotatably engaged to a respective one of the two lead screws.

15. A support device comprising:

a frame including a base and an upright support;

a seat assembly including a seating surface and connecting means for operatively connecting the seating surface to the frame;

a lifting mechanism for vertically displacing the seat assembly between a lowered position and a seating position; and a control panel for controlling at least the lifting mechanism, the control panel removably positioned on the upright support.

* * * * *